United States Patent
Hamada et al.

(10) Patent No.: US 7,319,794 B2
(45) Date of Patent: Jan. 15, 2008

(54) IMAGE DECODING UNIT, IMAGE ENCODING/ DECODING DEVICES USING IMAGE DECODING UNIT, AND METHOD THEREOF

(75) Inventors: Mana Hamada, Fukuoka (JP); Shunichi Kurohmaru, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 786 days.

(21) Appl. No.: 10/832,266

(22) Filed: Apr. 27, 2004

(65) Prior Publication Data
US 2004/0240743 A1    Dec. 2, 2004

(30) Foreign Application Priority Data
May 8, 2003 (JP) .............................. 2003-130259

(51) Int. Cl.
G06K 9/36 (2006.01)
G06K 9/46 (2006.01)
(52) U.S. Cl. ...................................................... 382/233
(58) Field of Classification Search ................ 382/233, 382/234, 236, 250, 304; 375/240.17, 240.2, 375/240.25; 386/109, 111
See application file for complete search history.

(56) References Cited

U.S. PATENT DOCUMENTS

| | | | |
|---|---|---|---|
| 5,812,735 A | * | 9/1998 | Wada ........................... 386/81 |
| 5,905,534 A | | 5/1999 | Sumihiro et al. |
| 6,075,899 A | * | 6/2000 | Yoshioka et al. ........... 382/233 |
| 6,539,120 B1 | * | 3/2003 | Sita et al. .................... 382/233 |
| 2002/0118743 A1 | | 8/2002 | Jiang |

FOREIGN PATENT DOCUMENTS

WO    WO 95/02948    1/1995

* cited by examiner

Primary Examiner—Phuoc Tran
(74) Attorney, Agent, or Firm—Wenderoth, Lind & Ponack, L.L.P.

(57) ABSTRACT

An image decoding unit comprises a decoding unit, a data memory unit, a reconstruction unit, and a frame memory. The decoding unit includes an entropy decoder, a motion compensator, an inverse quantizer, and an inverse DCT unit. The data memory unit includes a data memory A and a data memory B. In the middle of the data transfer from the data memory unit to the frame memory, the reconstruction unit that inputs intermediate data of decoding and outputs reconstructed image data is provided; thereby, the processing of generating the reconstructed image data and the processing of storing the reconstructed image data into the frame memory can be performed in parallel. By the structure, a high-speed processing of image reconstruction can be performed.

25 Claims, 12 Drawing Sheets

IMAGE DECODING UNIT, IMAGE ENCODING/ DECODING DEVICES USING IMAGE DECODING UNIT, AND METHOD THEREOF

BACKGROUND OF THE INVENTION

1. Field of the Invention

The present invention relates to an image decoding unit, image encoding/decoding devices using the image decoding unit, and a method thereof. In particular, it relates to an art of high-speed processing in generating reconstructed images.

2. Description of the Related Art

In recent years, as information devices and information terminals which can treat moving pictures have rapidly progressed, technology to compress the moving pictures has attracted increasing attention.

The moving picture compression technology has been standardized by standards such as MPEG-2 and MPEG-4 proposed by MPEG (Moving Picture Experts Group), or H.261, H.263 and H.264 proposed by ITU (International Telecommunication Union). The moving picture compression technology according to these standards compresses moving pictures in extreme compactness, utilizing a strong correlation between a frame and its adjacent frame in the moving pictures.

First of all, a general prior art on moving picture compression will be explained, with reference to FIGS. 10 to 12.

FIG. 10 shows a block diagram illustrating an image encoding device in the prior art. Construction and operation of the image encoding device is roughly explained in the following.

The image encoding device in the prior art shown in FIG. 10 is a general image encoding device. The image encoding device comprises an input terminal 10, subtractor 11, a DCT unit (a discrete cosine transformer) 12, a quantizer 13, an entropy encoder 14, a sending buffer 15, an output terminal 16, a motion detector 17, an inverse quantizer 19, an inverse DCT unit 21, a motion compensator 22, an adder 23 and a frame memory 24.

The input terminal 10 connects with one of inputs of the subtractor 11 and one of inputs of the motion detector 17. Another input of the subtractor 11 connects with an output of the motion compensator 22. Another input of the motion detector 17 connects with an output of the frame memory 24.

An output of the subtractor 11 connects with an input of the DCT unit 12. An output of the DCT unit 12 connects with an input of the quantizer 13. An output of the quantizer 13 connects with an input of the entropy encoder 14 and an input of the inverse quantizer 19. Another input of the entropy encoder 14 connects with an output of the motion detector 17. An output of the entropy encoder 14 connects with an input of the sending buffer 15.

An output of the inverse quantizer 19 connects with an input of the inverse DCT unit 21. An output of the inverse DCT unit 21 connects with one of inputs of the adder 23. Another input of the adder 23 connects with an output of the motion compensator 22. An output of the adder 23 connects with the frame memory 24. The frame memory 24 also connects with another input of the motion detector 17.

Now, the operation of the image encoding device is outlined. An input image signal S10 at the input terminal 10 is fed to the motion detector 17. The motion detector 17 compares the input image signal S10 with a reconstructed image (often called as a reference image) which is stored in the frame memory 24, to generate a motion vector S11.

Using the motion vector S11, the motion compensator 22 generates a prediction image S12. The subtractor 11 calculates a difference between the input image signal S10 and the prediction image S12, the difference being a prediction error. The prediction error is fed to the DCT unit 12 to generate DCT coefficients. The DCT coefficients is fed to and quantized by the quantizer 13. The quantized DCT coefficients are encoded by the entropy encoder 14, together with the motion vector S11, into a variable length code such as a Huffman code or an arithmetic code. The variable length code is temporarily stored in the sending buffer 15 and sent out in a bit stream.

The quantized DCT coefficients are also processed by the inverse quantizer 19 and the inverse DCT unit 21, thus generating a local prediction error data S14. Using the local prediction error data S14 and the prediction image S12 generated by the motion compensator 22, the adder 23 generates a reconstructed image and stores the reconstructed image into the frame memory 24.

In a motion vector detection process, the motion detector 17 treats, as a process target block, a block made of several pixels within the present image. Utilizing a so-called block matching method, the motion detector 17 searches a location of the process target block in an image time-wisely previous to the present image, and detects a motion vector that indicates the direction and amount of the movement of the present image.

The motion compensator 22 adopts a method which makes the prediction error smaller by generating the prediction image S21 not only in a unit of a pixel but also in a unit of a subdivided pixel. The generation of a prediction image in a unit of a pixel is called full-pel motion compensation. On the contrary, the generation of a prediction image in a unit of a subdivided pixel is called sub-pel motion compensation, more specifically, it is called half-pel motion compensation when the subdivision is a half of a pixel, and quarter-pel motion compensation when the subdivision is a quarter of a pixel.

FIG. 11 shows a block diagram illustrating an image decoding device in the prior art. Referring to FIG. 11, a general decoding method is explained in the following.

The image decoding device in the prior art shown in FIG. 11 is a general image decoding device. The image decoding device comprises an input terminal 30, a receiving buffer 31, an entropy decoder 32, an inverse quantizer 19, an inverse DCT unit 21, a motion compensator 22, an adder 23, a frame memory 24, and an output terminal 33.

The input terminal 30 connects with an input of the receiving buffer 31. An output of the receiving buffer 31 connects with an input of the entropy decoder 32. An output of the entropy decoder 32 connects with an input of the inverse quantizer 19 and one of inputs of the motion compensator 22

An output of the inverse quantizer 19 connects with an input of the inverse DCT unit 21. An output of the inverse DCT unit 21 connects with one of inputs of the adder 23. Another input of the motion compensator 22 connects with an output of the frame memory 24. Another input of the adder 23 connects with output of the motion compensator 22. An output of the adder 23 connects with an input of the frame memory 24. An output of the frame memory 24 connects with the output terminal 33.

Now, the operation of the image decoding device is outlined. A received bit stream at the input terminal 30 is temporarily stored in the receiving buffer 31 and then fed to the entropy decoder 32.

The entropy decoder 32 decodes from the received bit stream a motion vector S31 and quantized DCT coefficients S32 for a prediction error. The quantized DCT coefficients S32 is processed by the inverse quantizer 19 and the inverse DCT unit 21, to generate DCT coefficients S35 for the prediction error. Then the DCT coefficients S35 is fed to the adder 23.

Meanwhile, the motion vector decoded by the entropy decoder 32 is fed to the motion compensator 22. The motion compensator 22 compensates a motion for a reconstructed image S33 stored in the frame memory 24, to generate a prediction image S34, which is subsequently fed to the adder 23. Adding the prediction image S34 and the DCT coefficients S35, the adder 23 generates a new reconstructed image S36 and stores it into the frame memory 24. The newly generated reconstructed image is provided from the frame memory 24 to the output terminal as a decoded image S37, then, displayed on an image display device externally installed.

In the motion compensation processed by the motion compensator 22, sub-pel motion compensation is sometime made, in addition to full-pel motion compensation, as in the image encoding device described above.

The area 20 surrounded by dot-and-dash lines shown in FIG. 10 is completely same, in terms of construction and functions of each elements included, as the counterpart area 20 shown in FIG. 11. (For this reason, the same numbers are labeled to the same elements in both figures.)

It should be noticed that the construction of the area 20 can be equally utilized in the image encoding device and the image decoding device.

A patent reference no. 1 (PCT international patent publication no. WO-9502948) disclosed a further device for the area 20 concerned.

FIG. 12 shows a block diagram illustrating a motion compensator to be used in a conventional moving image decoder, corresponding to FIG. 10 of the patent reference no.1. In FIG. 12, the same names as in but different numerical labels from the patent reference no.1 are used.

As shown in FIG. 12, a motion compensator 40 to be used in the conventional moving image decoder comprises an IDCT (Inverse Discrete Cosine Transformer) 41, which is the same as the Inverse DCT unit shown in FIG. 10, an MB (Macro Block) buffer 42, an adder 43, which is the same as the adder 23 in FIG. 10, a DRAM writing buffer 44 and a reference frame memory 45, which is the same as the frame memory 24 in FIG. 10. The MB buffer 42 comprises two banks, and the DRAM writing buffer 44 comprises a bank. The reference frame memory may be made of DRAMs.

The principal feature of the device shown in FIG. 12 lies in absorbing a difference in speed between reading from the IDCT 41 and writing into the reference frame memory 45, by providing the MB buffer 42, and in adjusting timing in reading and writing in the reference frame memory 45, by providing the DRAM writing buffer 44.

More specifically, the adder 43 adds a prediction macro block signal S44 fed by the reference frame memory 45 and an output signal S42 of the MB buffer 42, and generates a reconstructed image signal S43, which is subsequently written into the DRAM writing buffer 44. The DRAM writing buffer 44 retains the reconstructed image signal S43 until the reference frame memory 45 becomes ready for writing. The DRAM writing buffer 44 writes the reconstructed image signal S43 into the reference frame memory 45 when the reference frame memory 45 becomes ready. By the scheme described above, the inventors of the patent reference no. 1 claim that a low-speed, cost-saving DRAM can be used for the reference frame memory 45.

When the reference frame memory 45 possesses reading and writing speeds faster than a reading speed of the IDCT 41, by providing the DRAM writing buffer 44 with a bank, the bank is always empty when block data is inputted, since the block data inputted into the bank is read out before the next block data is inputted. By this device, the inventors of the patent reference no.1 further claim that memory size necessary for the timing adjusting buffer can be made smaller, thus reducing a scale of the hardware.

However, the device shown in FIG. 12 is just for full-pel motion compensation and can not treat sub-pel motion compensation.

As is made clear by the above description, the prior arts can not perform, with high efficiency and high-speed, the sub-pel motion compensation that is required for the recent image standards.

OBJECTS AND SUMMARY OF THE INVENTION

In view of the above, an object of the present invention is to provide an image decoding unite which can perform a high-speed, sub-pel motion compensation, image encoding/decoding devices using the image decoding unit, and an art related thereto.

A first aspect of the present invention provides an image decoding unit operable to decode an encoded image signal, the image decoding unit comprising: a decoding unit operable to decode the encoded image signal to generate at least two kinds of intermediate data; a data memory unit comprising a first memory and a second memory, the first memory and the second memory being operable to store cooperatively the at least two kinds of intermediate data; a reconstruction unit operable to generate reconstructed image data, by inputting the at least two kinds of intermediate data stored in the first memory and the second memory; and a third memory operable to store the reconstructed image data generated by the reconstruction unit.

According to the present structure, it is possible to realize a faster image decoding unit, by generating reconstructed image data from intermediate data in decoding process of image signals. The image decoding unit possesses a feature that the image decoding unit can be equally utilized in an image encoding device and an image decoding device.

A second aspect of the present invention provides an image decoding unit as defined in the first aspect of the present invention, wherein the encoded image signal to be decoded is an image signal encoded by employing DCT and entropy encoding, wherein the decoding unit comprises an entropy decoder, an inverse quantizer, an inverse DCT unit, and a motion compensator, wherein the entropy decoder decodes an inputted encoded image signal to feed quantized DCT coefficients and a motion vector, the inverse quantizer inverse-quantizes the quantized DCT coefficients fed by the entropy decoder, the inverse DCT unit calculates DCT coefficients, and the motion compensator performs a motion compensation process, using the motion vector fed by the entropy decoder.

According to the present structure, it is possible to provide a faster image decoding unit that can process an image signal encoded into a variable length code with DCT and entropy encoding. The image decoding unit possesses a feature that the image decoding unit can be equally utilized in an image encoding device and an image decoding device.

A third aspect of the present invention provides an image decoding unit as defined in the first aspect of the present invention, wherein a generation process of the reconstructed image data by the reconstruction unit and a storing process of the reconstructed image data into the third memory are performed in parallel.

According to the present structure, it is possible to shorten a necessary process time to almost a half by performing in parallel a generation process of the reconstructed image data by the reconstruction unit and a storing process of the reconstructed image data. This feature makes it possible to provide a faster image decoding unit.

A fourth aspect of the present invention provides an image decoding unit as defined in the first aspect of the present invention, wherein one of the intermediate data to be stored in the first memory is local prediction error data fed by the inverse DCT unit, and one of the intermediate data to be stored in the second memory is local prediction image data fed by the motion compensator, and wherein the reconstruction unit acquires the local prediction error data stored in the first memory and the local prediction image data stored in the second memory, and in synchronization with timing of the acquisition, the reconstruction unit generates reconstructed image data from the acquired local prediction error data and local prediction image data and stores successively the generated reconstructed image data into the third memory.

This structure makes it possible to provide a faster image decoding unit that is operable to process an image signal encoded into a variable length code by DCT and entropy encoding. This structure further provides a precise parallel processing and a high-speed processing, since generating the reconstructed image data and storing the generated reconstructed image data into a memory are processed in synchronization.

A fifth aspect of the present invention provides an image decoding unit as defined in the first aspect of the present invention, wherein the reconstruction unit adds the local prediction error data acquired from the first memory and the local prediction image data acquired from the second memory to obtain added data, normalizes the added data to a predetermined bit number to obtain normalized data, and outputs the normalized data.

According to the present structure, it is not necessary to perform another compensation operation to obtain correctly reconstructed image data after adding two pieces of intermediate data stored in the first memory and the second memory, even when the two pieces of the intermediate data have different numbers of bits or either piece of the intermediate data has a sign. Thereby, an image decoding unit can be realized by a simpler construction.

A sixth aspect of the present invention provides an image decoding unit as defined in the first aspect of the present invention, wherein the added data by the reconstruction unit is normalized to a positive value in 8 bits.

According to the present structure, it is not necessary to perform another compensation operation to obtain correctly reconstructed image data after adding two pieces of intermediate data stored in the first memory and the second memory, even when the two pieces of the intermediate data have different numbers of bits or either piece of the intermediate data has a sign. Furthermore, an 8-bit image decoding unit, which is most widely utilized in recent days, can be realized by a simpler construction.

A seventh aspect of the present invention provides an image decoding unit as defined in the first aspect of the present invention, wherein the motion compensator performs sub-pel motion compensation, the sub-pel motion compensation including at least one of half-pel motion compensation and quarter-pel motion compensation.

According to the present structure, it is possible to provide an image decoding unit that can perform the sub-pel motion compensation with a high efficiency and at a high-speed. The sub-pel motion compensation is required for the recent image standards.

An eighth aspect of the present invention provides an image decoding unit operable to decode an encoded image signal, the image decoding unit comprising: a decoding unit operable to decode the encoded image signal to generate at least two kinds of intermediate data; a memory group comprising plural data memories that are operable to store the at least two kinds of intermediate data; a first selector operable to select one of the plural data memories of the memory group, and operable to acquire first intermediate data of the at least two kinds of intermediate data; a second selector operable to select one of the plural data memories of the memory group, and operable to acquire second intermediate data of the at least two kinds of intermediate data; a reconstruction unit operable to generate reconstructed image data using the first intermediate data acquired by the first selector and the second intermediate data acquired by the second selector; a third selector operable to select and acquire data from one of the plural data memories of the memory group or an output of the reconstruction unit; a memory operable to store the data acquired by the third selector; and a data transfer controller operable to send data transfer command to the first selector, the second selector and the third selector, and operable to select a data transfer source for each of the selectors.

According to the present structure, it is feasible to provide an image decoding unit that can transfer complicated data and is readily and flexibly applicable to various circumstances, by describing data transfer commands in terms of DSP commands when the decoding unit is composed by a DSP (digital signal processor).

A ninth aspect of the present invention provides an image decoding unit as defined in the eighth aspect of the present invention, wherein the encoded image signal to be decoded is an image signal encoded by employing DCT and entropy encoding, wherein the decoding unit comprises an entropy decoder, an inverse quantizer, an inverse DCT unit, and a motion compensator, and wherein the decoding unit is operable to generate at least two kinds of intermediate data.

According to the present structure, it is possible to provide an image decoding unit that has the same features as the image decoding unit described in the eighth aspect, and that can perform a high-speed decoding for an image signal encoded into variable length codes by employing DCT and entropy encoding.

A tenth aspect of the present invention provides an image decoding unit as defined in the eighth aspect of the present invention, wherein the first intermediate data is local prediction image data and the second intermediate data is local prediction error data.

According to the present structure, it is possible to provide an image decoding unit that has the same features as the image decoding units described in the eighth and the ninth aspects, and that can perform a high-speed decoding for an image signal encoded into variable length codes by employing DCT and entropy encoding.

An eleventh aspect of the present invention provides a data transfer method utilizing an image decoding unit, the image decoding unit including: a decoding unit operable to decode an encoded image signal to generate at least two kinds of intermediate data; a memory group including plural data memories that are operable to store the at least two kinds of intermediate data; a first selector operable to select one of the plural data memories of the memory group, and operable to acquire first intermediate data of the at least two kinds of intermediate data; a second selector operable to select one of the plural data memories of the memory group, and operable to acquire second intermediate data of the at least two kinds of intermediate data; a reconstruction unit operable to generate reconstructed image data using the first intermediate data acquired by the first selector and the second intermediate data acquired by the second selector; a third selector operable to select and acquire data from one of the plural data memories of the memory group or an output of the reconstruction unit; a memory operable to store the data acquired by the third selector; and a data transfer controller operable to send data transfer command to the first selector, the second selector and the third selector, and operable to select a data transfer source for each of the selectors, the data transfer method comprising: issuing a data transfer command including a first operant that assigns the third selector, as a data transfer source, one of the plural data memories of the data group or an output of the reconstruction unit, a second operant that assigns the first selector, as a data transfer source, one of the plural data memories of the data group, and a third operant that assigns the second selector, as a data transfer source, one of the plural data memories of the data group; and acquiring data from a data transfer source selected by a selector that has received the data transfer command, wherein, when a data transfer command is issued assigning the third selector the output of the reconstruction unit as the data transfer source, the first selector acquires first intermediate data from an assigned data memory, the second selector acquires second intermediate data from an assigned data memory, the reconstruction unit generates reconstructed image data using the first intermediate data and the second intermediate data, and the reconstruction unit stores the generated reconstructed image data into the memory successively.

According to the present method, data transfer commands can be standardized by describing the data transfer commands in terms of DSP commands, when the decoding unit is composed by a DSP (digital signal processor). Furthermore, the use of the data transfer commands allows more complicated data transfer; thereby it becomes feasible to provide an image decoding unit that can transfer more complicated data and is readily and flexibly applicable to various circumstances.

A twelfth aspect of the present invention provides a data transfer method utilizing an image decoding unit, the image decoding unit including: a decoding unit operable to decode an encoded image signal to generate at least two kinds of intermediate data; a memory group comprising plural data memories that are operable to store the at least two kinds of intermediate data; a first selector operable to select one of the plural data memories of the memory group, and operable to acquire first intermediate data of the at least two kinds of intermediate data; a second selector operable to select one of the plural data memories of the memory group, and operable to acquire second intermediate data of the at least two kinds of intermediate data; a reconstruction unit operable to generate reconstructed image data using the first intermediate data acquired by the first selector and the second intermediate data acquired by the second selector; a third selector operable to select and acquire data from one of the plural data memories of the memory group or an output of the reconstruction unit; a memory operable to store the data acquired by the third selector; and a data transfer controller operable to send data transfer command to the first selector, the second selector and the third selector, and operable to select a data transfer source for each of the selectors, the data transfer method comprising: issuing a data transfer command including an operant that assigns the third selector, as a data transfer source, one of the plural data memories of the data group or an output of the reconstruction unit; acquiring data from an assigned data transfer source selected by the third selector, upon receipt of the data transfer command; wherein, when a data transfer command is issued assigning the third selector the output of the reconstruction unit as the data transfer source, the first selector acquires first intermediate data from a pre-assigned data memory, the second selector acquires second intermediate data from a pre-assigned data memory, the reconstruction unit generates reconstructed image data using the first intermediate data and the second intermediate data, and the reconstruction unit stores the generated reconstructed image data into the memory successively.

According to the present method, it is possible to install data transfer commands that include image reconstruction processing, as data transfer commands used in a normal processor; thereby the data transfer controller can be realized in a simpler configuration.

A thirteenth aspect of the present invention provides an image encoding device comprising: an image decoding unit; a motion detector; a prediction error process unit; a DCT unit; a quantizer; an entropy encoder; and a sending buffer, wherein the image decoding unit comprising; a decoding unit comprising an inverse quantizer, an inverse DCT unit, and a motion compensator, and operable to decode an encoded image signal to generate at least two kinds of intermediate data; a data memory unit comprising a first memory and a second memory, the first memory and the second memory being operable to store cooperatively the at least two kinds of intermediate data; a reconstruction unit operable to generate reconstructed image data, by inputting the at least two kinds of intermediate data stored in the first memory and the second memory; and a third memory operable to store the reconstructed image data generated by the reconstruction unit, wherein the motion detector detects a motion vector for an input image, using the reconstructed image data generated by the image decoding unit as a reference image, wherein the prediction error process unit obtains a prediction error by calculating a difference between the input image and a prediction image fed by the image decoding unit after motion compensation based on the motion vector, wherein the DCT unit obtains DCT coefficients performing a DCT process for the prediction error, wherein the quantizer obtains quantized DCT coefficients quantizing the DCT coefficients, wherein the entropy encoder encodes the quantized DCT coefficients and the motion vector into variable-length codes to generate encoded image data, and wherein the sending buffer stores temporally the encoded image data and sends the encoded image data in a sending bit stream successively.

According to the present structure, it is possible to provide an image encoding device making the best use of the features that the image decoding unite possesses as described in the second aspect of the present invention. When the image decoding unit is prepared as a standardized unit, it is possible to produce the image encoding device using a smaller number of parts, thereby reducing a production cost for the image encoding device.

A fourteenth aspect of the present invention provides an image decoding unit as defined in the thirteenth aspect of the present invention, wherein a generation process of the reconstructed image data by the reconstruction unit and a storing process of the reconstructed image data into the third memory are performed in parallel.

According to the present structure, by performing in time-wisely parallel a generation process of the reconstructed image data by the reconstruction unit and a storing process of the reconstructed image data, necessary process time can be reduced almost by half. Thereby, it is feasible to provide an image encoding device using a high-speed image decoding unit.

A fifteenth aspect of the present invention provides an image decoding unit as defined in the thirteenth aspect of the present invention, wherein the reconstruction unit adds the local prediction error data acquired from the first memory and the local prediction image data acquired from the second memory to obtain added data, normalizes the added data to a predetermined bit number to obtain normalized data, and outputs the normalized data.

According to the present structure, it is possible to realize an image encoding device using an image decoding unit that has features described in the fifth aspect of the present invention.

A sixteenth aspect of the present invention provides an image decoding device comprising: an image decoding unit; and a receiving buffer operable to store temporally a received bit stream composing encoded image data, wherein the image decoding unit comprising; a decoding unit comprising an entropy decoder, an inverse quantizer, an inverse DCT unit, and a motion compensator, and operable to decode an encoded image data to generate at least two kinds of intermediate data; a data memory unit comprising a first memory and a second memory, the first memory and the second memory being operable to store cooperatively the at least two kinds of intermediate data; a reconstruction unit operable to generate reconstructed image data, by inputting the at least two kinds of intermediate data stored in the first memory and the second memory; and a third memory operable to store the reconstructed image data generated by the reconstruction unit, wherein the receiving buffer feeds the encoded image data stored therein to the entropy decoder of the image decoding unit, and wherein the image decoding unit calculates DCT coefficients and a motion vector to generate local prediction error data and local prediction image data, both being the intermediate data, generates reconstructed image data using the intermediate data, stores the generated reconstructed image data into the third memory as pictorial image, and feeds the stored pictorial image to an externally connected image display unit.

According to the present structure, it is possible to provide an image decoding device making the best use of the features that the image decoding unit possesses as described in the second aspect of the present invention. When the image decoding unit is prepared as a standardized unit, it is possible to produce the image decoding device using a smaller number of parts, thereby reducing a production cost for the image decoding device.

A seventeenth aspect of the present invention provides an image decoding unit as defined in the sixteenth aspect of the present invention, wherein a generation process of the reconstructed image data by the reconstruction unit and a storing process of the reconstructed image data into the third memory are performed in parallel.

According to the present structure, by performing in time-wisely parallel a generation process of the reconstructed image data by the reconstruction unit and a storing process of the reconstructed image data, necessary process time can be reduced almost by half. Thereby, it is feasible to provide an image decoding device using a high-speed image decoding unit.

A eighteenth aspect of the present invention provides an image decoding unit as defined in the sixteenth aspect of the present invention, wherein the reconstruction unit adds the local prediction error data acquired from the first memory and the local prediction image data acquired from the second memory to obtain added data, normalizes the added data to a predetermined bit number to obtain normalized data, and outputs the normalized data.

According to the present structure, it is possible to provide an image decoding device using an image decoding unit that possesses features described in the fifth aspect of the present invention.

A nineteenth aspect of the present invention provides an image decoding method to decode an encoded image signal, the image decoding method comprising: decoding the encoded image data to generate at least two kinds of intermediate data; storing the at least two kinds of intermediate data into a first memory and a second memory; generating reconstructed image data using the intermediate data inputted from the first memory and the second memory; and storing the reconstructed image data generated in the generating into a third memory, wherein the generating the reconstructed image data and the storing the reconstructed image data are performed in parallel.

According to the present method, it is possible to realize a faster image decoding unit, by generating reconstructed image data from intermediate data in decoding process of image signals. More specifically, necessary process time can be reduced almost by half, by performing in time-wisely parallel a generation process of the reconstructed image data by the reconstruction unit and a storing process of the reconstructed image data. Furthermore, the present image decoding method can be equally utilized in an image encoding device and an image decoding device.

A twentieth aspect of the present invention provides an image decoding method as defined in the nineteenth aspect of the present invention, wherein the encoded image signal to be decoded is an image signal encoded by employing DCT and entropy encoding, wherein the decoding comprises entropy decoding, inverse quantizing, inverse DCT processing, and motion compensation processing, wherein in the entropy decoding, an inputted encoded image signal is decoded to feed quantized DCT coefficients and a motion vector, wherein in the inverse quantizing and the inverse DCT processing, the quantized DCT coefficients fed in the entropy decoding are processed to feed DCT coefficients, and wherein in the motion compensation processing, motion compensation is performed using the motion vector fed in the entropy decoding.

According to the present method, it is possible to provide a faster image decoding unit that can process an image signal encoded into a variable length code with DCT and entropy encoding. The present image decoding method can be equally applied to an image encoding device and an image decoding device.

A twenty-first aspect of the present invention provides an image decoding method as defined in the nineteenth aspect of the present invention, wherein the intermediate data to be stored in the first memory is local prediction error data fed in the inverse DCT processing, and the intermediate data to be stored in the second memory is local prediction image data fed in the motion compensation processing, and wherein the generating reconstructed image data comprises: acquiring the local prediction error data stored in the first memory and the local prediction image data stored in the second memory; generating reconstructed image data from the acquired local prediction error data and local prediction image data in synchronization with the acquisition of the local prediction error data and the local prediction image data; and storing successively the generated reconstructed image data into the third memory.

According to the present method, it is possible to realize a faster image decoding unit that decodes an image signal encoded into a variable length code by DCT and entropy encoding. This method further provides a precise parallel processing and a high-speed processing, since generating the reconstructed image data and storing the generated reconstructed image data into a memory are processed in synchronization.

A twenty-second aspect of the present invention provides an image decoding method as defined in the nineteenth aspect of the present invention, wherein the generating reconstructed image data comprises adding the local prediction error data acquired from the first memory and the local prediction image data acquired from the second memory to obtain added data, normalizing the added data to a predetermined bit number to obtain normalized data, and outputting the normalized data.

According to the present method, it is not necessary to perform another compensation operation to obtain correctly reconstructed image data after adding two pieces of intermediate data stored in the first memory and the second memory, even when the two pieces of the intermediate data have different numbers of bits or either piece of the intermediate data has a sign. Thereby, an image decoding unit can be realized by a simpler construction by use of the present method.

A twenty-third aspect of the present invention provides an image decoding method as defined in the nineteenth aspect of the present invention, wherein the motion compensation processing comprises performing sub-pel motion compensation.

According to the present method, it is possible to realize an image decoding unit that can perform the sub-pel motion compensation with a high efficiency and at a high-speed. The sub-pel motion compensation is required for the recent image standards.

A twenty-fourth aspect of the present invention provides an image decoding method utilizing an image decoding unit, the image decoding unit including: a decoding unit comprising an inverse quantizer, an inverse DCT unit, and a motion compensator, and operable to decode an encoded image signal to generate at least two kinds of intermediate data; a data memory unit including a first memory and a second memory, the first memory and the second memory being operable to store cooperatively the at least two kinds of intermediate data; a reconstruction unit operable to generate reconstructed image data using the at least two kinds of intermediate data inputted from the first memory and the second memory; and a third memory operable to store the reconstructed image data generated by the reconstruction unit, wherein a generation process of the reconstructed image data by the reconstruction unit and a storing process of the reconstructed image data into the third memory are performed in parallel, the image encoding method comprising: motion detection processing to detect a motion vector for an input image, using reconstructed image data fed by the image decoding unit as a reference image, prediction error processing to obtain a prediction error by calculating a difference between the input image and a prediction image fed by the image decoding unit after motion compensation based on the motion vector, DCT processing to obtain DCT coefficients from the prediction error, quantizing the DCT coefficients to obtains quantized DCT coefficients, entropy-encoding the quantized DCT coefficients and the motion vector into variable-length codes to generate encoded image data, storing temporally the encoded image data, and sending the encoded image data in a sending bit stream successively.

According to the present method, it is possible to realize an image encoding device that possesses the same features as described in the nineteenth aspect of the present invention.

A twenty-fifth aspect of the present invention provides an image decoding method utilizing an image decoding device, the image decoding device including an image decoding unit and a receiving buffer, the image decoding unit including: a decoding unit including an entropy decoder, an inverse quantizer, an inverse DCT unit, and a motion compensator, and operable to decode an encoded image signal to generate at least two kinds of intermediate data; a data memory unit comprising a first memory and a second memory, the first memory and the second memory being operable to store the at least two kinds of intermediate data; a reconstruction unit operable to generate reconstructed image data, by inputting the at least two kinds of intermediate data stored in the first memory and the second memory; and a third memory operable to store the reconstructed image data generated by the reconstruction unit, wherein a generation process of the reconstructed image data by the reconstruction unit and a storing process of the reconstructed image data into the third memory are performed in parallel, the image decoding method comprising: storing temporally into the receiving buffer a received bit stream composing image data, calculating, in the image decoding unit, DCT coefficients and a motion vector from the inputted encoded image data, generating, in the image decoding unit, the intermediate data composed of local prediction error data and local prediction image data, generating, in the image decoding unit, reconstructed image data using the intermediate data, storing the generated reconstructed image data into the third memory as pictorial image, and feeding the stored pictorial image to an externally connected image display unit.

According to the present method, it is possible to realize an image decoding device that possesses the same features as described in the nineteenth aspect of the present invention.

The inventors of the present invention endeavored at first to solve the problems of the present invention, based on the idea disclosed by the patent reference no. 1.

The prior art motion compensation method for moving images, as described in FIG. 12, assumes full-pel motion compensation as a premise. Revising the prior art method so as to perform sub-pel motion compensation, one example as shown in FIG. 1 is constructed.

FIG. 1 shows a block diagram illustrating a first revised sub-pel motion compensator 20, based on the prior art. An inverse DCT unit 21 in FIG. 1 corresponds to the IDCT 41 in FIG. 12. Similarly, a DRAM buffer 42 in FIG. 1 corresponds to the DRAM writing buffer 44 in FIG. 12, and a frame memory 24 in FIG. 1 corresponds to the reference frame memory 45 in FIG. 12.

In the structure shown in FIG. 1, a motion compensator 50 with sub-pel motion compensation and a second bank in the DRAM buffer 42 are newly added. A motion vector S42 fed to the motion compensator 50 and a reconstructed image signal S43 outputted from the frame memory 24 are explicitly depicted in FIG. 1.

According to the structure shown in FIG. 1, sub-pel motion compensation becomes possible to be performed. In this structure, however, a generation of the reconstructed image after sub-pel motion compensation requires calculation using neighboring pixels around the target pixel for which the motion compensation is performed. Therefore, this structure needs to install an exclusive buffer memory to store the neighboring pixels, thereby adversely increasing the circuit size.

To overcome the adverse shortcoming described above, the present inventors took further consideration.

FIG. 2 shows a block diagram illustrating a second revised sub-pel motion compensator 20, based on the prior art. The second revised sub-pel motion compensator 20 comprises, as shown in FIG. 2, a decoding unit 60, a data memory unit 64, and a frame memory 24, wherein the decoding unit 60 comprises an inverse DCT unit 60, a motion compensator 62, and an adder 63.

The operation of the second revised sub-pel motion compensator 20 is explained in the following. First, necessary data is taken from the frame memory 24 and temporally stored to the data memory unit 64. Accessing to the data memory unit 64, whenever necessary, the decoding unit 60 performs an inverse DCT processing in the inverse DCT unit 61, full-pel and sub-pel motion compensation in the motion compensator 62, and a generation of a reconstructed image in the adder 63. Then, the decoding unit 60 transfers the generated reconstructed image from the data memory unit 60 to the frame memory 24. As described above, the structure shown in FIG. 2 can generate reconstructed images with sub-pel motion compensation, without using any exclusive buffer memory.

However, recent image processing devices are demanded increasingly higher performance year after year, requiring further improved process capability in image processing. To meet such high performance by the first and second revised sub-pel motion compensators, the decoding unit 60 should operate at an ever higher operation frequency, thereby posing new problems of increased circuit size or increased electric power consumption.

DETAILED DESCRIPTION OF THE PREFERRED EMBODIMENTS

Based on the above-described examinations, the present inventors have reached the following invention by a new approach.

Hereinafter, embodiments of the present invention are described with reference to the accompanying drawings.

Embodiment 1

Figure 3:
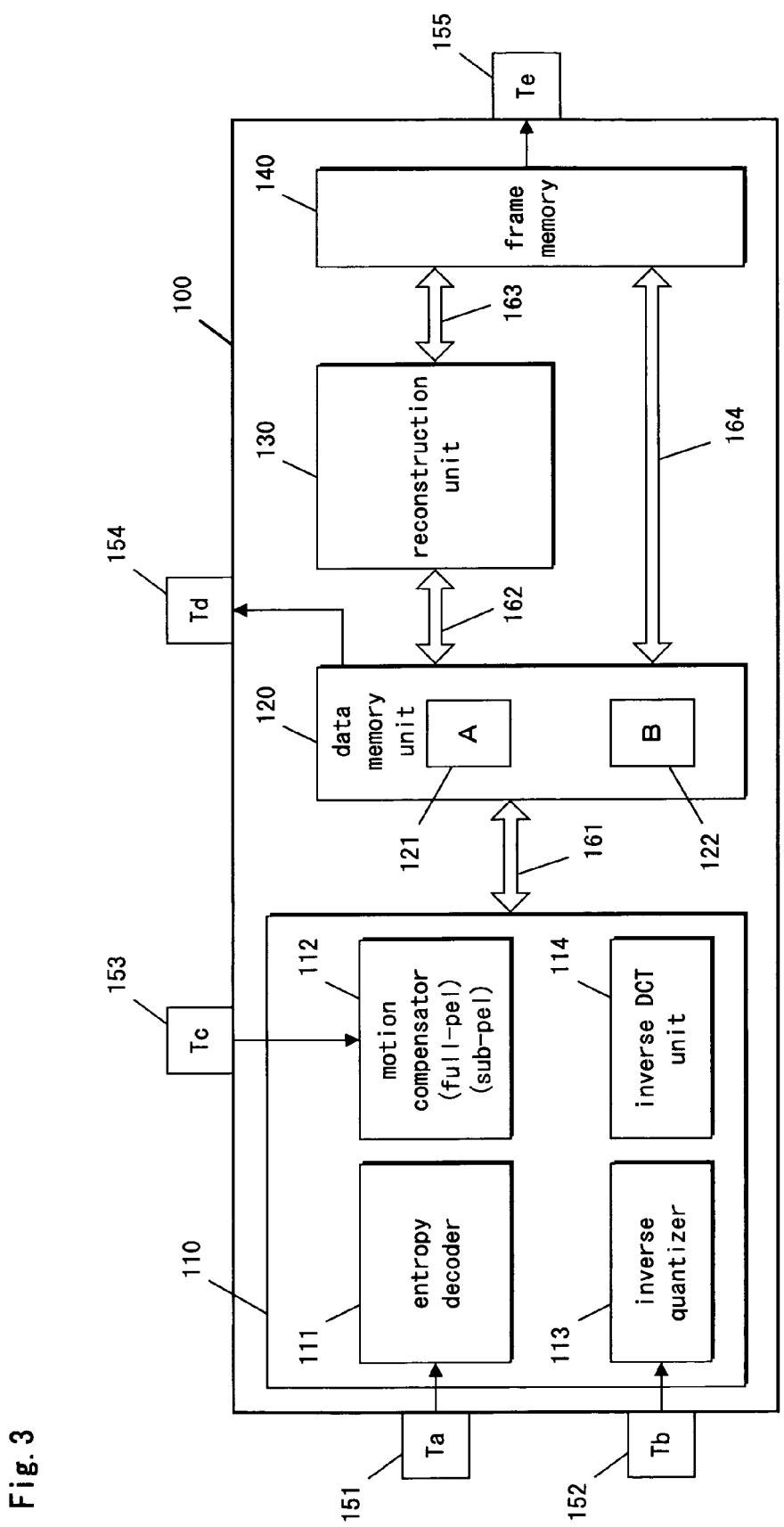
FIG. 3 shows a block diagram illustrating an image decoding unit according to a first embodiment of the present invention.

FIG. 3 is a diagram illustrating an image decoding unit 100 according to a first embodiment of the present invention. The image decoding unit 100 of the present embodiment comprises a decoding unit 110, a data memory unit 120, a reconstruction unit 130, and a frame memory 140; the decoding unit 110 includes an entropy decoder 111, a motion compensator 112, an inverse quantizer 113, and an inverse DCT unit 114; and the data memory unit 120 includes a data memory A 121 and a data memory B 122.

The decoding unit 110 connects with the data memory unit 120 via a data bus 161. The data memory unit 120 further connects with the reconstruction unit 130 via a data bus 162, and the frame memory 140 via a data bus 164. The reconstruction unit 130 further connects with the frame memory 140 via a data bus 163.

The image decoding unit 100 of the present embodiment possesses five external contact terminals. To be more specific, a terminal Ta 151 is an input terminal to the entropy decoder 111, a terminal Tb 152 is an input terminal to the inverse quantizer 113, a terminal Tc 153 is an input terminal to the motion compensator 112, a terminal Td 154 is an output terminal from the data memory unit 120, and a terminal Te 155 is an output terminal from the frame memory 140.

When decoding a signal that has been entropy-encoded, the image decoding unit 100 of the present embodiment can process in parallel the process which generates reconstructed image data, and the process which stores the reconstructed image data into the frame memory 140, by providing the reconstruction unit 130 in the middle of the data transfer from the data memory unit 120 to the frame memory 140. The reconstruction unit 130 inputs intermediate data in the middle of decoding, and outputs the reconstructed image data. Thereby, image reconstruction is processed at high speed.

With reference to FIG. 3, the operation of the image decoding unit 100 according to the present embodiment is described.

First, necessary data is once taken into the data memory unit 120 from the frame memory 140 via the data bus 164. The decoding unit 110, accessing the data memory unit 120 from time to time, performs an inverse DCT process in the inverse DCT unit 114, and a full-pel and sub-pel motion compensation process in the motion compensator 112. A local prediction error data processed by the inverse DCT unit 114 is stored in the data memory A 121.

Next, the motion compensator 112 acquires a motion vector either from the terminal Tc 153 or the entropy decoder 111, from which the motion vector is acquired will be described later in a second embodiment and a third embodiment of the present invention. In order to perform the motion compensation using the acquired motion vector, the reconstructed image data stored in the frame memory 140 is taken into the data memory unit 120 as full-pel reference image data via the data bus 164. The motion compensator 112 performs sub-pel motion compensation to the full-pel reference image data taken into the data memory unit 120, and stores the calculated sub-pel local prediction image data in the data memory B 122.

At this point, the local prediction error data that the inverse DCT unit 114 outputted is stored in the data memory A 121, and the sub-pel local prediction image data that the motion compensator 112 processed is stored in the data memory B 122.

Next, the reconstruction unit 130 reads the local prediction error data stored in the data memory A 121 and the sub-pel local prediction image data stored in the data memory B 122 simultaneously. After adding the local prediction error data and the sub-pel local prediction image data, the reconstruction unit 130 clips the addition result to 8 bits, and stores the result in the frame memory 140 as reconstructed image data in order.

According to the present embodiment, operation in the reconstruction unit 130 is an addition and 8-bit clip process. Although image data is normally a positive value in 8 bits, the image data is usually represented in 9 bits, since the local prediction error data acquired as an output of the inverse DCT unit 114 can take a positive or a negative value. For this reason, when the local prediction error data (9 bits with a sign) and the local prediction image data (positive 8 bits) are simply added, the result is not always a positive value of 8 bits, hence, necessitating further compensation operation to obtain correctly reconstructed image data. Therefore, in the present embodiment, the reconstruction unit 130 performs process which clips the data after addition to a positive value of 8 bits. The reconstruction unit 130 does not limit the operation to an addition and clip process, but can perform other processes such as weighted addition following the standard of image process.

Figure 6:
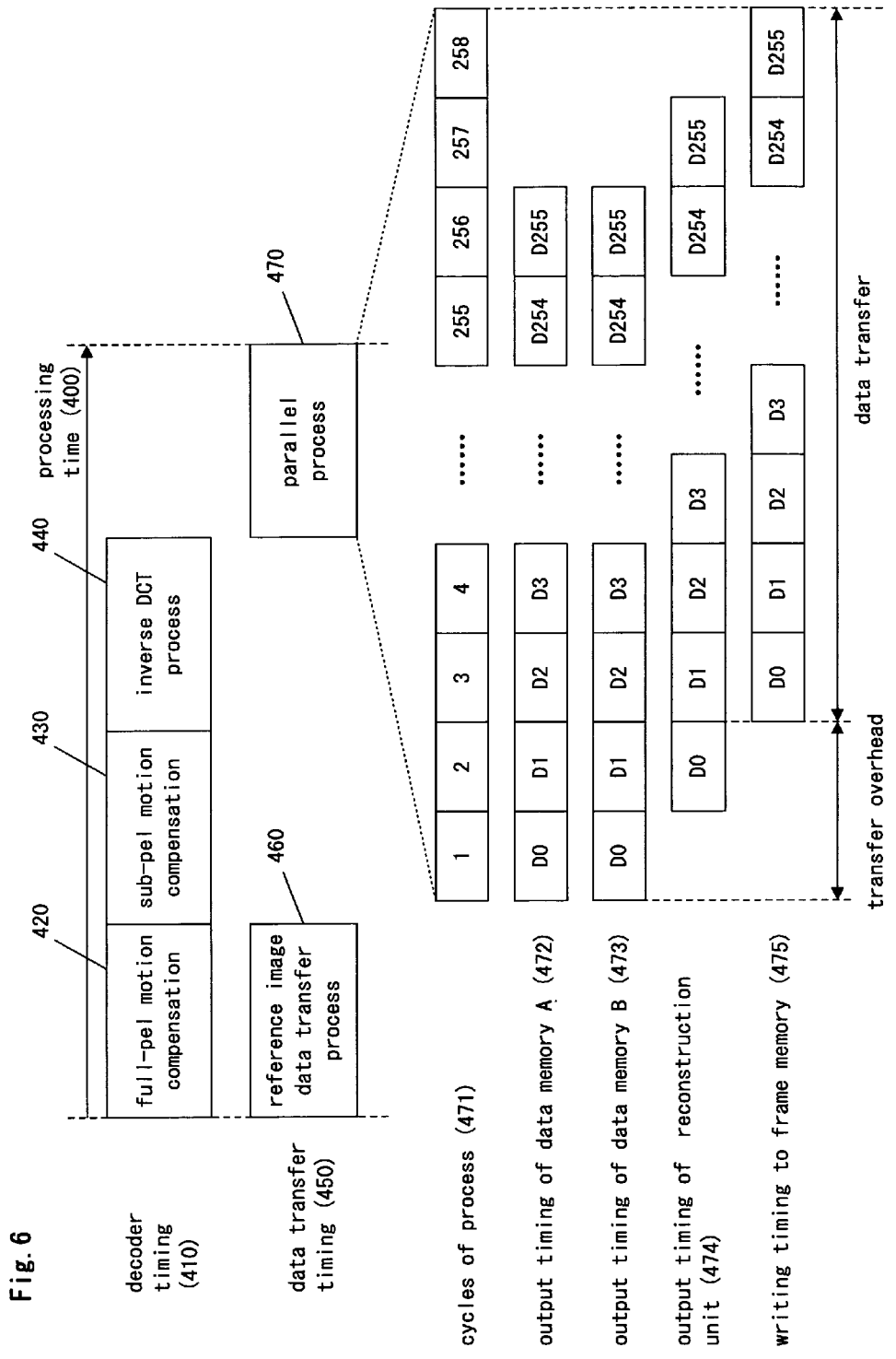
FIG. 6 shows a timing chart for the image decoding unit according to the first embodiment of the present invention.

The above-described operation of the image decoding unit 100 of the present embodiment is shown in a timing chart of FIG. 6. FIG. 6 shows a timing chart for the image decoding unit 100 according to the first embodiment of the present invention. Taking as an example a case where data transfer and various image processes are performed in a macro block unit, an outline of the processes is described hereinafter.

In FIG. 6, a decoder timing (410) shows process timing of each element of the decoding unit 110 shown in FIG. 3, and a data transfer timing (450) shows timing of the data transfer via each data bus. Moreover, a process time (400) shows that process of each element advances from the left to the right with time.

As shown in FIG. 6, the decoding unit 110 shown in FIG. 3 performs a full-pel motion compensation process 420, a sub-pel motion compensation process 430, and an inverse DCT process 440 in that order. While the decoding unit 110 is performing the full-pel motion compensation process 420, a full-pel reference image data transfer process 460 is performed from the frame memory 140 to the data memory unit 120 via the data bus 164. When the decoding unit 110 ends the inverse DCT process 440, the local prediction error data for 256 macro blocks are stored in the data memory A 121, and the local prediction image data for 256 macro blocks are stored also in the data memory B 122, respectively. When the decoding unit 110 ends the inverse DCT process 440, a parallel process 470 is performed. The parallel process comprises a reconstruction process (process in the reconstruction unit 130) and a transfer process of reconstructed image data (data transfer from the reconstruction unit 130 to the frame memory 140). Hence, the reconstruction unit 130 shown in FIG. 3 performs reconstruction process in order for the local prediction error data with 256 macro blocks and the local prediction image data with 256 macro blocks and stores the result into the frame memory 140 simultaneously.

The parallel process 470 is described further in full detail with reference to FIG. 6. The lower half of FIG. 6 shows cycles 1 to 258 of the cycles of the process (471) that an image decoding unit 100 performs.

An output timing of the data memory A (472) and an output timing of the data memory B (473) shown in FIG. 6 show timing at which data D0 through data D255 are outputted in cycles 1 through 256, respectively. Here, D0 shows the 0th macro block data, D255 shows the 255th macro block data, and so on.

An output timing of the reconstruction unit (474) shows timing at which the data D0 through the data D255 are outputted in cycles 2 through 257. A writing timing to a frame memory (475) shows timing at which the data D0 through the data D255 are stored into the frame memory 140 in cycles 3 through 258.

Thus, in the present embodiment, the parallel process 470 of the reconstruction process and the transfer process of reconstructed image data completes the process of 256 macro blocks, equivalent to one frame of an image, in cycles 1 through 258. At this time, the cycle 1 and the cycle 2 are a transfer overhead period, and the cycles 3 through 258 are an actual data transfer period.

In order to further clarify the feature of the present embodiment, the second revised sub-pel motion compensator 20, which is revised from the prior art and shown in FIG. 2, is once again described hereinafter as a comparative example.

Figure 7:
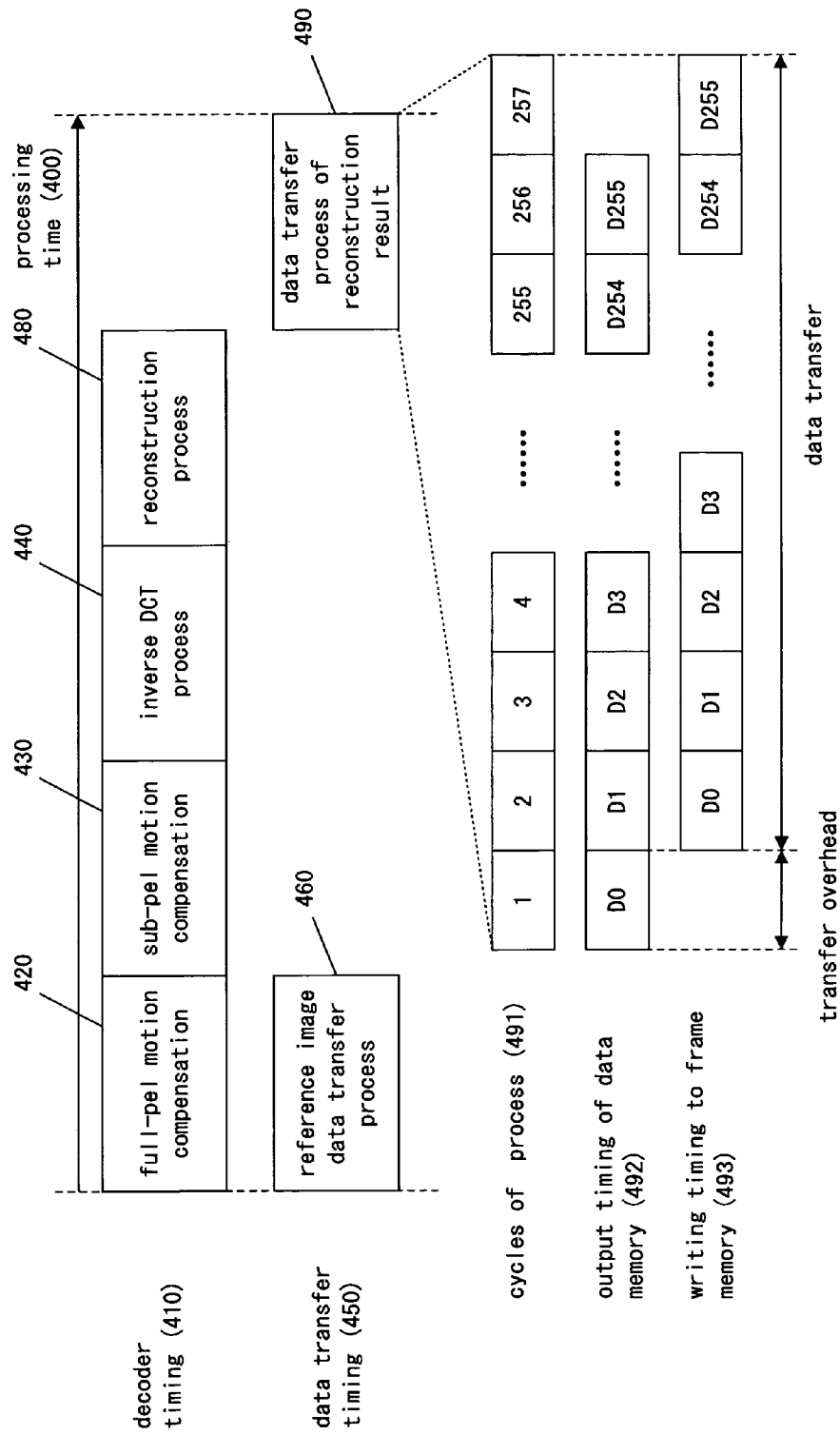
FIG. 7 shows a timing chart for the second revised motion compensator, based on the prior art.

FIG. 7 is a timing chart for the second revised sub-pel motion compensator 20, based on the prior art. In FIG. 7, description is omitted by attaching the same symbols regarding the same processes as in FIG. 6.

Figure 1:
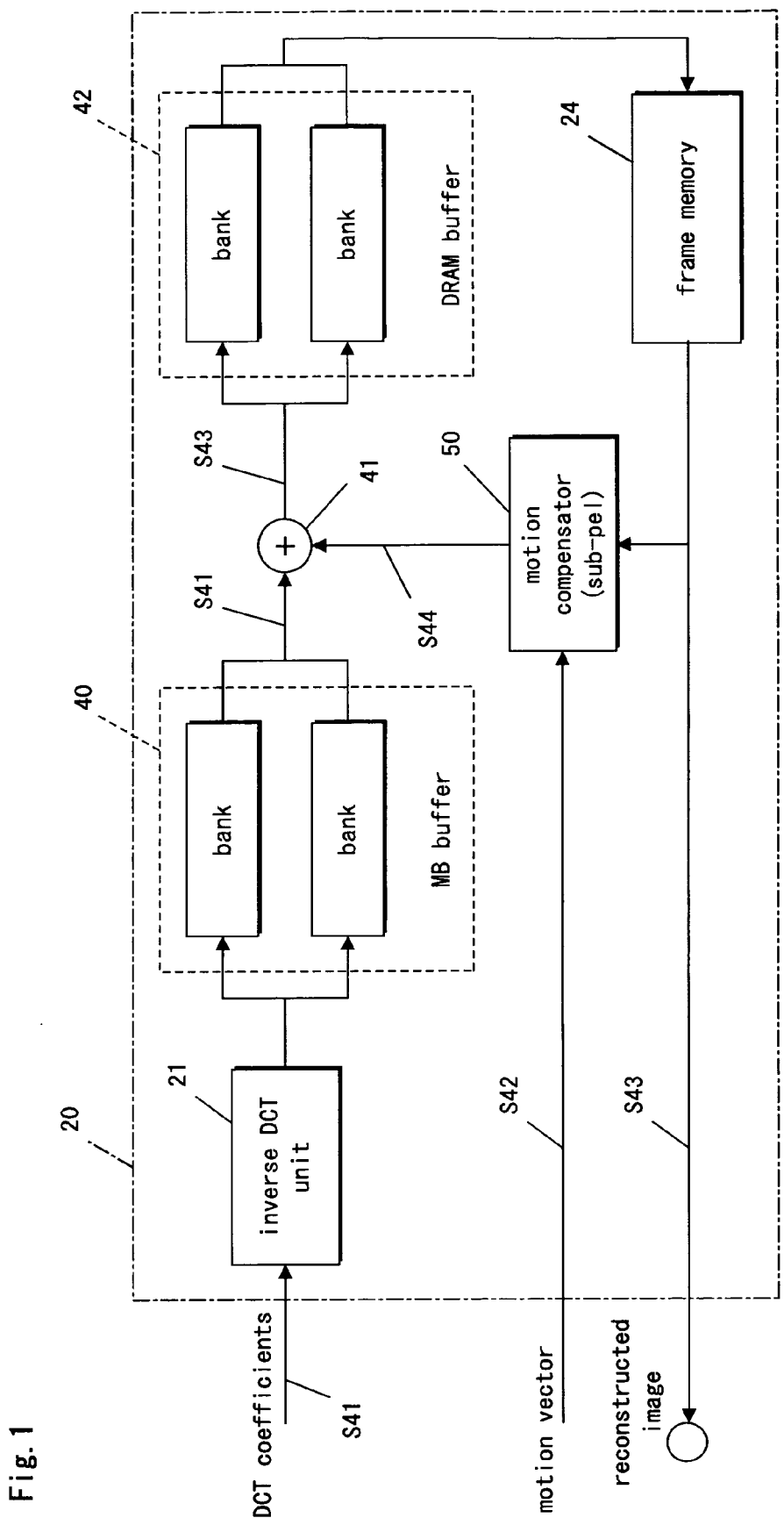
FIG. 1 shows a block diagram illustrating a first revised motion compensator, based on the prior art.
Figure 2:
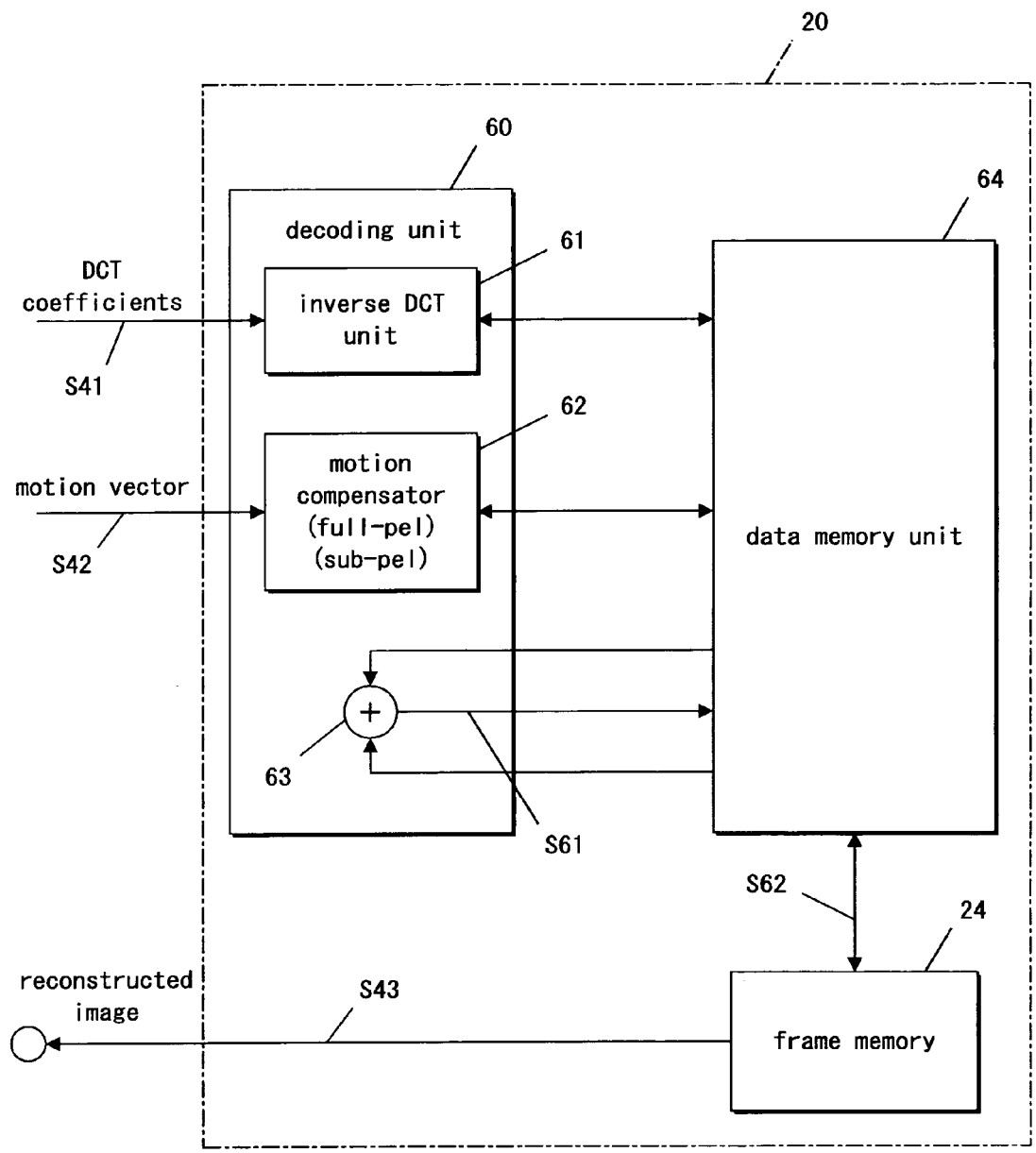
FIG. 2 shows a block diagram illustrating a second revised motion compensator, based on the prior art.

As shown in FIG. 7, the decoding unit 60 of the second revised sub-pel motion compensator 20 shown in FIG. 2 performs a reconstruction process 480 after performing process of the full-pel motion compensation process 420, the sub-pel motion compensation process 430, and the inverse DCT process 440. When the decoding unit 60 is performing the full-pel motion compensation process 420, the full-pel reference image data transfer process 460 from the frame memory 24 to the data memory 64 is performed. When the decoding unit 60 completes the reconstruction process 480, a data transfer process of reconstruction result 490 from the data memory unit 64 to the frame memory 24 is performed.

Details of the data transfer process of the reconstruction result 490 are shown in the lower half of FIG. 7. A writing timing to a frame memory (493) is performed with one-cycle delay to an output timing of a data memory (492), and the transfer process of the 256 macro blocks, equivalent to one frame of an image, is completed in 257 cycles. At this time, the cycle 1 is a transfer overhead period and from the cycles 2 through 257 are an actual data transfer period.

FIG. 6 and FIG. 7 are compared in detail. The number of cycles spent on data transfer has only the difference of 1 cycle between the present embodiment and the second revised example. In the second revised example, the process cycle for the reconstruction process 480 is necessary after the inverse DCT process 440. In the present embodiment, however, the reconstruction process and the image transfer process are performed in parallel; therefore the number of process cycles for the parallel process is reduced. It turns out that time equivalent to this reduced number of process cycles amounts to about 7% of the process time necessary for the whole decoding process, and that remarkable improvement in the speed is realized by the present embodiment.

The frame memory 140 of FIG. 3 in the present embodiment can store frame data of an image, and can be constructed by a mass memory, internally or externally installed, which may serve as a transfer source or a transfer destination of a plurality of resources. Moreover, the frame memory 140 can either be a single memory or a plurality of memories. More specifically, when the frame memory 140 is installed externally, SDRAM and DRAM may be used, and when the frame memory 140 is installed internally, mixed built-in DRAM and SRAM may be used.

Embodiment 2

Figure 4:
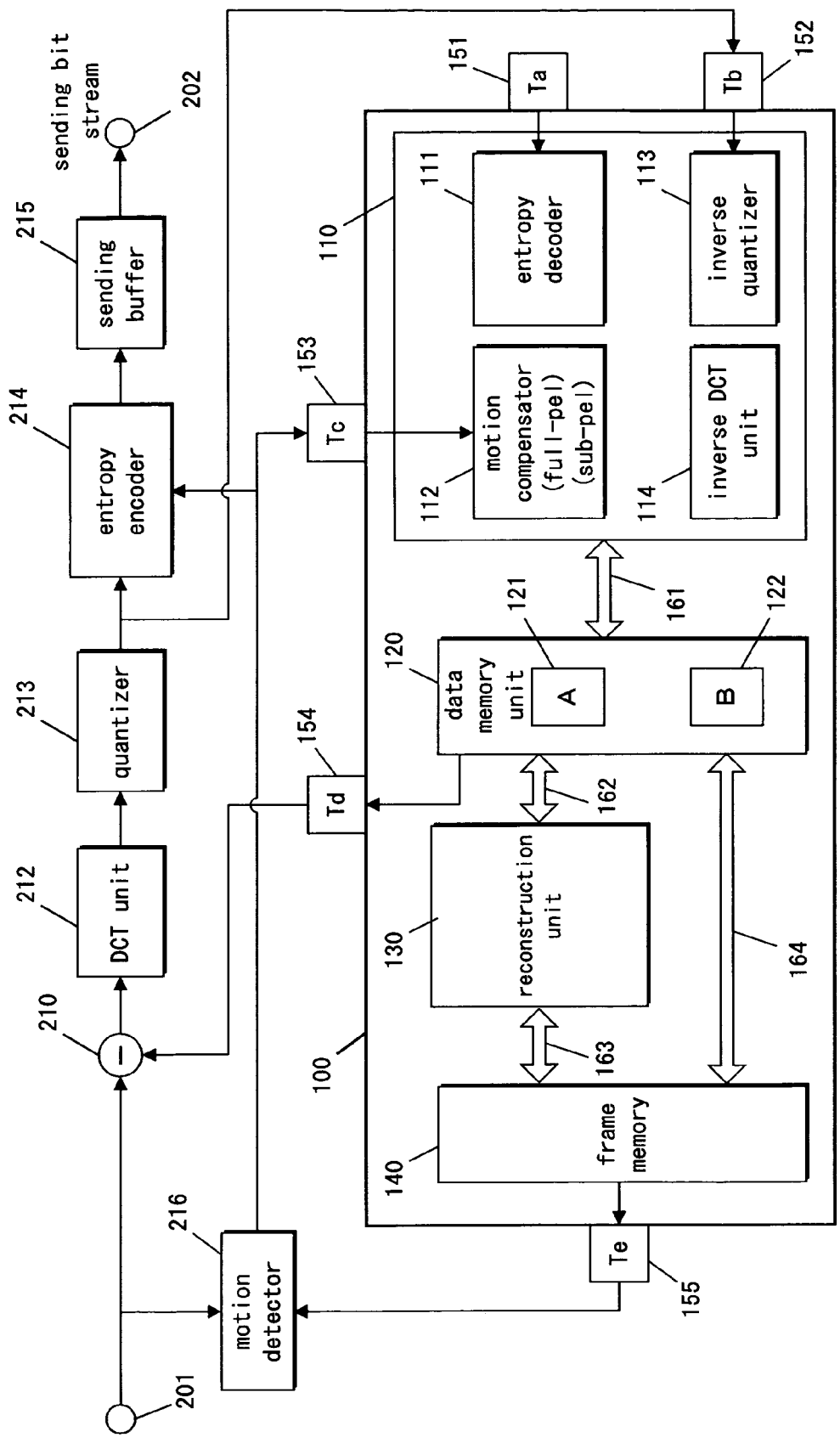
FIG. 4 shows a block diagram illustrating an image encoding device according to a second embodiment of the present invention.

FIG. 4 shows a block diagram illustrating an image encoding device according to a second embodiment of the present invention. The image encoding device of the present embodiment comprises an input terminal 201, an output terminal 202, the image decoding unit 100, a subtractor 210, a DCT unit 212, a quantizer 213, an entropy encoder 214, a sending buffer 215, and a motion detector 216.

The input terminal 201 connects with an input of the subtractor 210 and an input of the motion detector 216. Another input of the subtractor 210 connects with the terminal Td 154 of the image decoding unit 100, and an output of the subtractor 210 connects with an input of the quantizer 213. An output of the quantizer 213 connects with an input of the entropy encoder 214 and the terminal Tb 152 of the image decoding unit 100. Another input of the motion detector 216 connects with the terminal Te 155 of the image decoding unit 100. An output of the motion detector 216 connects with another input of the entropy encoder 214 and the terminal Tc 153 of the image decoding unit 100. Furthermore, an output of the entropy encoder 214 connects with an input of the sending buffer 215, and an output of the sending buffer 215 connects with the output terminal 202. The terminal Ta 151 of the image decoding unit 100 is not connected to anywhere.

Although the image decoding unit 100 shown in FIG. 4 and the image decoding unit 100 shown in FIG. 3 are drawn in a mirror image, the construction and the function are the same, and the same symbols are attached to each element. Therefore, the explanation is omitted.

The outline of the operation for the image encoding device of the present embodiment is explained in the following.

As shown in FIG. 4, an input image, which is inputted in the input terminal 201, is fed to the motion detector 216 and the subtractor 210. The input image fed to the motion detector 216 is compared with the reconstructed image data as a reference image to generate a motion vector. The reconstructed image data is stored in the frame memory 140 of the image decoding unit 100.

The input image, which is inputted in the input terminal 201, is also fed to the subtractor 210. In the subtractor 210, using the above-described motion vector, the input image is compared with the prediction image that is stored in the data memory unit 120 to generate a prediction error data as a difference of the comparison.

The prediction error data is fed to the DCT unit 212 to calculate DCT coefficients. The DCT coefficients are then quantized in the quantizer 213 and sent to the entropy encoder 214. The entropy encoder 214 encodes the quantized DCT coefficients into variable-length codes together with the motion vector that is obtained by the motion detector 216. The entropy encoded variable-length codes are temporarily stored in the sending buffer 215, and sent out to the output terminal 202 as a sending bit stream.

The quantized DCT coefficients in the quantizer 213 are also sent to the terminal Tb 152 of the image decoding unit 100. In the image decoding unit 100, the quantized DCT coefficients are decoded using the motion vector that is inputted into the terminal Tc 153, and then the decoded result is stored in the data memory unit 120 and the frame memory 140.

As described in the first embodiment, the decoding process in the image decoding unit 100 is the parallel processing, which utilizes the intermediate processed data, thereby the high-speed processing is performed. It is needless to say that the sub-pel motion compensation process is performed. Since the explanation was given in the first embodiment, it is omitted here.

As described above, the image encoding device of the present embodiment can be composed of few element parts using the image decoding unit 100 that can be manufactured as a standard LSI. The image encoding device of the present embodiment can realize a high-speed and high-efficiency processing using the high-speed parallel processing.

Embodiment 3

Figure 5:
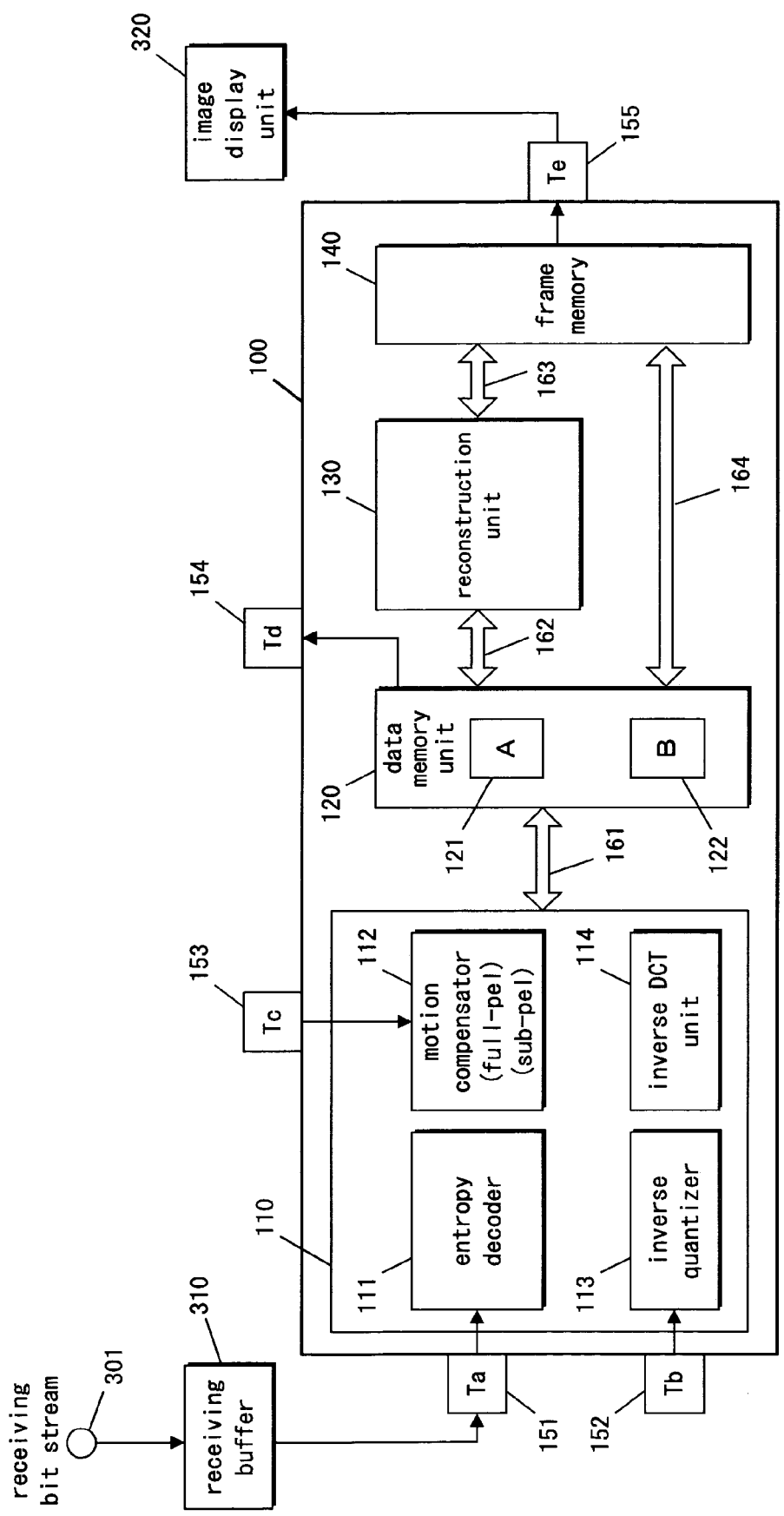
FIG. 5 shows a block diagram illustrating an image decoding device according to a third embodiment of the present invention.

FIG. 5 shows a block diagram illustrating the image decoding device according to a third embodiment of the present invention. The image decoding device of the present embodiment comprises an input terminal 301, a receiving buffer 310, and the image decoding unit 100. The input terminal 301 connects with an input of the receiving buffer 310, and an output of the receiving buffer 310 connects with the terminal Ta 151 of the image decoding unit 100. Furthermore, the terminal Te 155 of the image decoding unit 100 connects with an image display unit 320 externally installed. The terminal Tb 152, the terminal Tc 153, and the terminal Td 154 of the image decoding unit 100 are not connected to anywhere.

Since the construction and function of the image decoding unit 100 shown in FIG. 5 and the image decoding unit 100 shown in FIG. 3 are the same, the same symbols are attached to each element, and the explanation is omitted.

The outline of the operation for the image decoding device of the present embodiment is explained in the following.

As shown in FIG. 5, a received bit stream, which is entropy-encoded and inputted into the input terminal 301, is temporarily stored in the receiving buffer 31, and then fed to the terminal Ta 151 of the image decoding unit 100.

The terminal Ta 151 connects with the entropy decoder 111 of the decoding unit 110. In the entropy decoder 111, a motion vector and quantized DCT coefficients are detected from the received bit stream that is fed. The motion vector is sent to the motion compensator 112, and the quantized DCT coefficients are sent to the inverse quantizer 113 and the inverse DCT unit 114. The subsequent decoding processing in the image decoding unit 100 is the same as the processing in the first embodiment, therefore, the explanation is omitted.

In the image decoding unit 100, as explained in the first embodiment, the decoding processing is parallel processing that utilizes the intermediate processing data, thereby the high-speed processing is performed,. It is needless to say that the sub-pel motion compensation process is also performed in the present embodiment.

Thus, the image decoding device of the present embodiment can be composed of only one additional element part or the receiving buffer 310, using the image decoding unit 100 that can be manufactured as a standard LSI. The image encoding device of the present embodiment can realize a high-speed and high-efficiency processing using the high-speed parallel processing.

Embodiment 4

Figure 8:
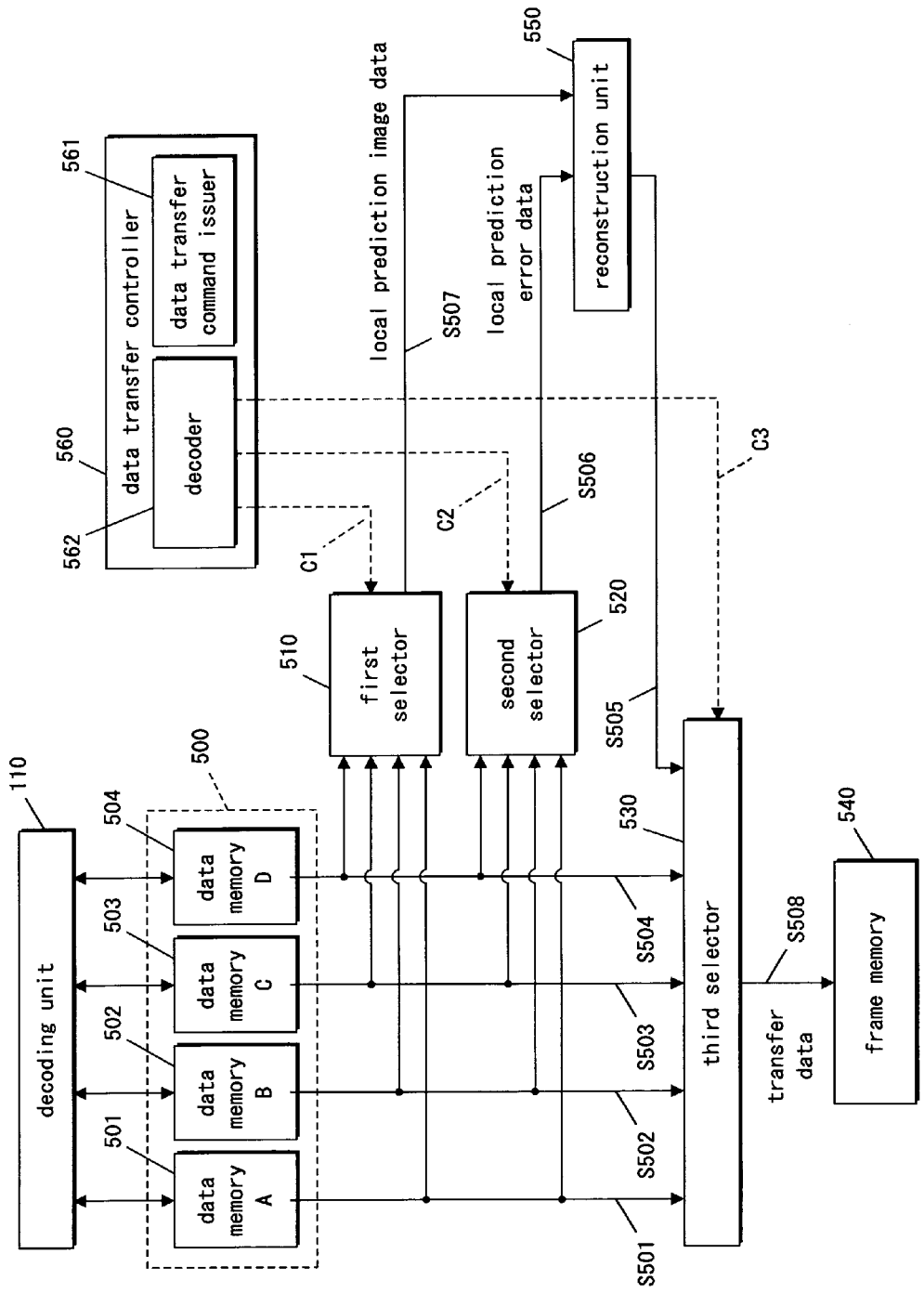
FIG. 8 shows a block diagram illustrating an image decoding unit according to a fourth embodiment of the present invention.

FIG. 8 shows a block diagram illustrating an image decoding unit according to a fourth embodiment of the present invention. The image decoding unit of the present embodiment comprises a decoding unit 110, a data memory group 500, a first selector 510, a second selector 520, a third selector 530, a frame memory 540, a reconstruction unit 550, and a data transfer controller 560.

The data memory group 500 includes a data memory A 501, a data memory B 502, a data memory C 503, and a data memory D 504.

The decoding unit 110 shown in FIG. 8 connects with each data memory of the data memory group 500. The construction and function of the decoding unit 110 of the present embodiment are exactly as same as the construction and function of the decoding unit 110 included in the image decoding unit 100 in the first embodiment, as shown in FIG. 3. Therefore, the details of the decoding unit 110 are not shown in FIG. 8.

An output of each data memory of the data memory group 500 connects with the first selector 510, the second selector 520, and the third selector 530. An output chosen by the first selector 510 connects with an input of the reconstruction unit 550. An output chosen by the second selector 520 connects with the other input of the reconstruction unit 550. An output of the reconstruction unit 550 connects with the fifth input of the third selector 530. An output of the third selector 530 connects with the frame memory 540.

Furthermore, the data transfer controller 560 includes a data transfer command issuer 561 and a decoder 562. Control signal lines C1, C2, and C3 from the decoder 562 are respectively connected to the first selector 510, the second selector 520, and the third selector 530.

Next, the outline of the operation for the image decoding unit of the present embodiment is explained.

In each data memory of the data memory group 500 shown in FIG. 8, local prediction image data or local prediction error data processed by the decoding unit 110 are stored as intermediate data.

According to a data transfer command issued by the data transfer controller 560 via the control signal line C1, the first selector 510 selects one data memory of the data memory group 500, acquires a local prediction image data S507, and inputs the data into one of the inputs of reconstruction unit 550.

On the other hand, according to a data transfer command issued by the data transfer controller 560 via the control signal line C2, the second selector 520 selects another data memory of the data memory group 500, acquires a local prediction error data S506, and inputs the data into the other of the inputs of the reconstruction unit 550.

The reconstruction unit 550 generates a reconstructed image data S505 from the local prediction image data and the local prediction error data that are respectively inputted from the first selector 510 and the second selector 520, and sends the reconstructed image data S505 to the fifth input of the third selector 530.

According to a data transfer command issued by the data transfer controller 560 via the control signal line C3, the third selector 530 selects one output among the outputs S501, S502, S503, S504 of the data memory group 500 and the reconstructed image data S505 generated by the reconstruction unit 550, and sends the selected output to the frame memory 540 as a transfer data S508.

Figure 9:
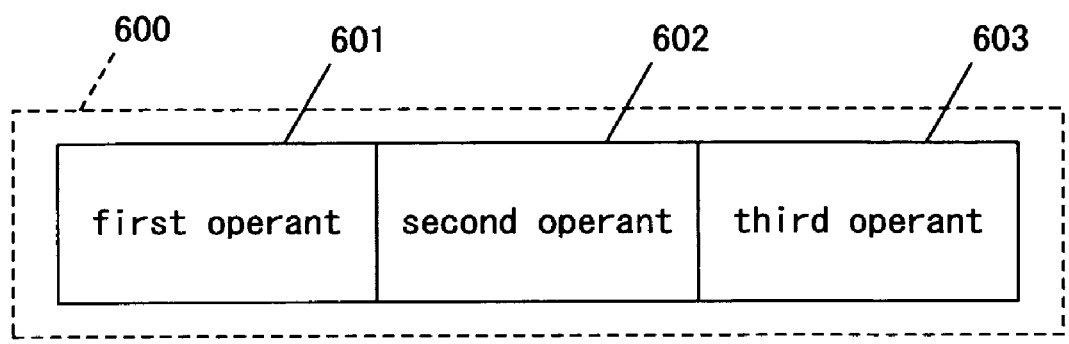
FIG. 9 illustrates a data transfer command to be used in the image decoding unit according to the fourth embodiment of the present invention.
Figure 10:
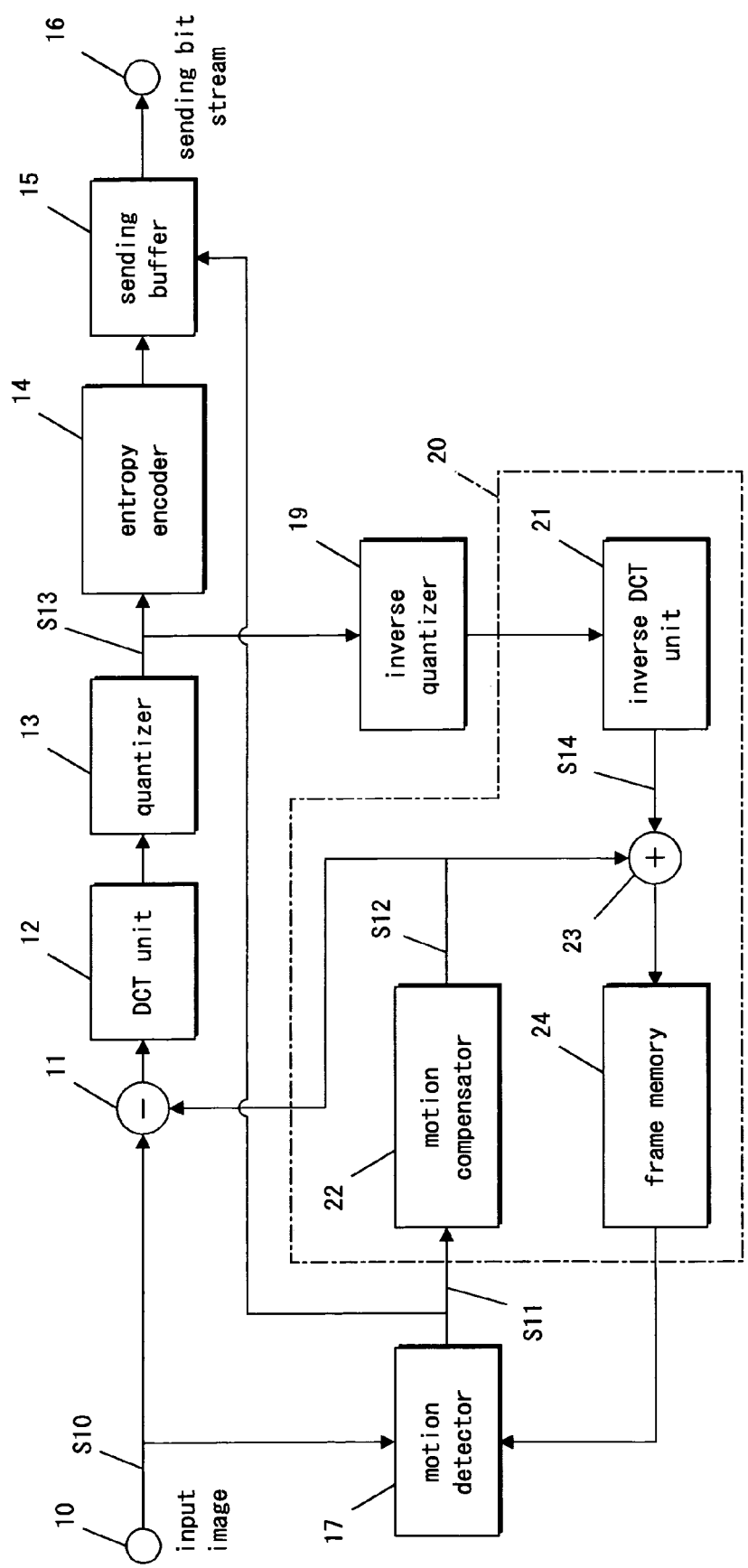
FIG. 10 shows a block diagram illustrating an prior art image encoding device.
Figure 11:
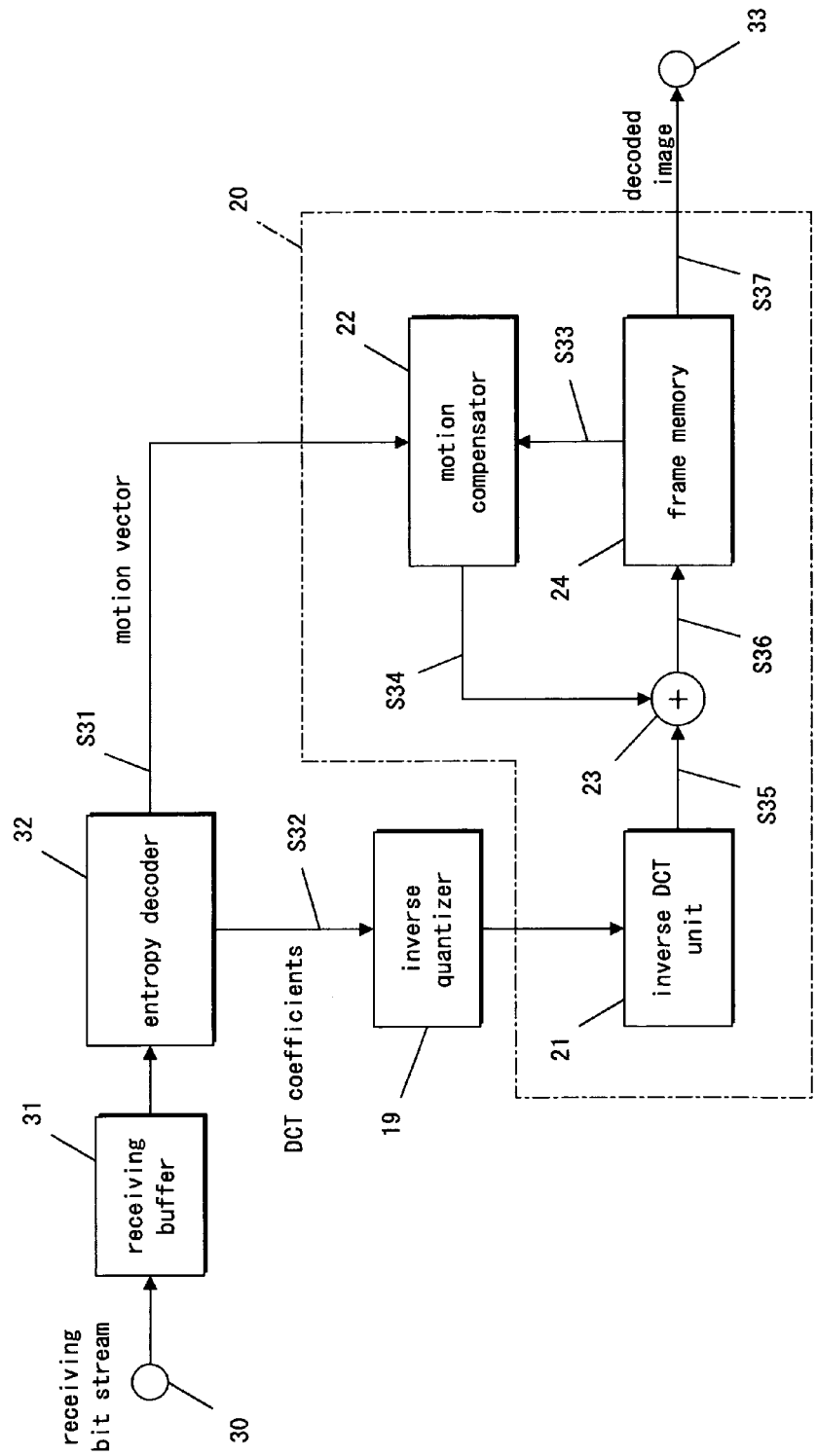
FIG. 11 shows a block diagram illustrating an prior art image decoding device.
Figure 12:
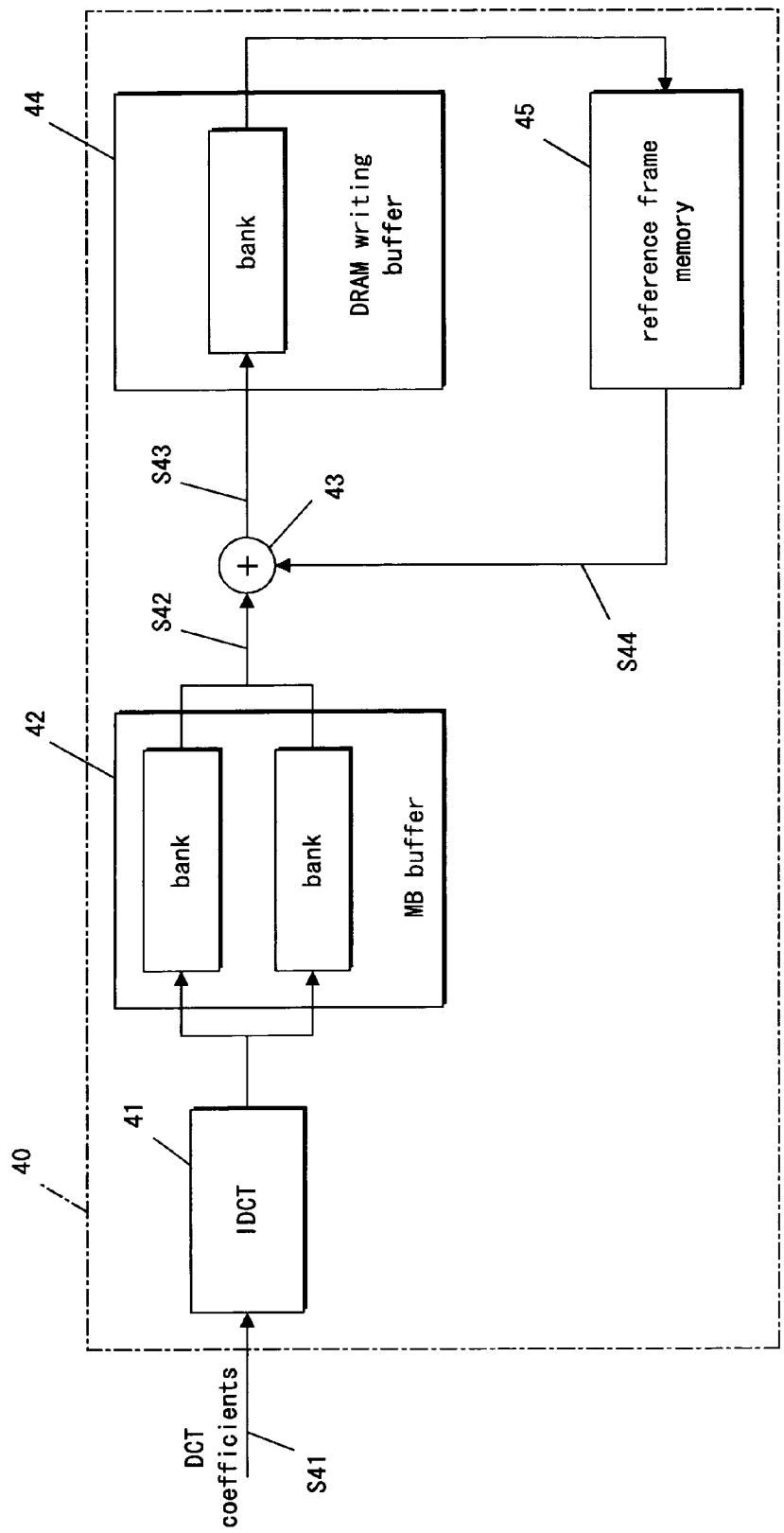
FIG. 12 shows a block diagram illustrating a motion compensator used in a prior art moving image decoding device.

The data transfer command as shown in FIG. 9 has been devised in order to realize the data transfer between the ordinary data memories (the data memory A 501 through the data memory D504, shown in FIG. 8) and the frame memory 540 with the command of the DSP.

FIG. 9 illustrates a data transfer command 600 to be used in the image decoding unit according to the fourth embodiment of the present invention. The data transfer command 600 includes a first operant 601, a second operant 602, and a third operant 603.

The first operant 601 controls the third selector 530. According to a command indicated in the first operant 601, the third selector 530 selects one output among the outputs S501, S502, S503, S504 of the data memory group 500 and the reconstructed image data S505 generated by the reconstruction unit 550.

The second operant 602 controls the first selector 510. According to a command indicated in the second operant 602, the first selector 510 selects one among the outputs S501, S502, S503 and S504 of the data memory group 50 and outputs the local prediction image data S507.

The third operant 603 controls the second selector 520. According to a command indicated in the third operant 603, the second selector 520 selects one among the outputs S501, S502, S503 and S504 of the data memory group 500, and outputs the local prediction error data S506.

By describing the data transfer command 600 by the DSP command as discussed above, it becomes possible to realize the image decoding unit that can perform more complicated data transfer and is flexibly adaptable to application environment.

It is one of the features of the present embodiment that the third selector 530 is devised to be able to select even the reconstructed image data S505 generated by the reconstruction unit 550, by the first operant 601 of the data transfer 600. With this device, the data transfer command accompanying the reconstruction process can be realized without affecting the frame memory 540.

If data memories that store the local prediction image data S507 and the local prediction error data S506, which are necessary for the reconstruction process, are predetermined, the prediction image data S507 and the local prediction error data S506 can be acquired from the predetermined data memories, when the third selector 530 selects, in response to the first operant 601 of the data transfer command 600, the reconstructed image data S505 generated by the reconstruction unit 550. In this case, the data transfer command 600 should specify only the first operant 601.

In the decoding of the image signal, the present invention intends to realize a high-speed image decoding processing by generating the reconstructed image data using the intermediate data, performing in parallel the generation processing of the reconstructed image data and the storing processing into the frame memory. Therefore, various applications can be possible as long as the purport of the present invention does not deviate.

The present invention can provide an image decoding unit, image encoding/decoding devices using the image decoding unit, and a method thereof, which can perform high-speed sub-pel motion compensation in less necessary processing time, by generating reconstructed image data using intermediate data and performing in parallel the generation processing of the reconstructed image data and the storing processing into the frame memory, in the decoding processing of the image signal.

What is claimed is:

1. An image decoding unit operable to decode an encoded image signal, the image decoding unit comprising:
    a decoding unit operable to decode the encoded image signal to generate at least two kinds of intermediate data;
    a data memory unit comprising a first memory and a second memory, said first memory and said second memory being operable to store cooperatively the at least two kinds of intermediate data;
    a reconstruction unit operable to generate reconstructed image data, by inputting the at least two kinds of intermediate data stored in said first memory and said second memory; and
    a third memory operable to store the reconstructed image data generated by said reconstruction unit.

2. The image decoding unit as defined in claim 1, wherein the encoded image signal to be decoded is an image signal encoded by employing DCT and entropy encoding,
    wherein said decoding unit comprises an entropy decoder, an inverse quantizer, an inverse DCT unit, and a motion compensator,
    wherein said entropy decoder decodes an inputted encoded image signal to feed quantized DCT coefficients and a motion vector, said inverse quantizer inverse-quantizes the quantized DCT coefficients fed by said entropy decoder, said inverse DCT unit calculates DCT coefficients, and said motion compensator performs a motion compensation process, using the motion vector fed by said entropy decoder.

3. The image decoding unit as defined in claim 1, wherein a generation process of the reconstructed image data by said reconstruction unit and a storing process of the reconstructed image data into said third memory are performed in parallel.

4. The image decoding unit as defined in claim 1, wherein one of the intermediate data to be stored in said first memory is local prediction error data fed by said inverse DCT unit, and one of the intermediate data to be stored in said second memory is local prediction image data fed by said motion compensator, and
    wherein said reconstruction unit acquires the local prediction error data stored in said first memory and the local prediction image data stored in said second memory, and in synchronization with timing of the acquisition, said reconstruction unit generates reconstructed image data from the acquired local prediction error data and local prediction image data and stores successively the generated reconstructed image data into said third memory.

5. The image decoding unit as defined in claim 1, wherein said reconstruction unit adds the local prediction error data acquired from said first memory and the local prediction image data acquired from said second memory to obtain added data, normalizes the added data to a predetermined bit number to obtain normalized data, and outputs the normalized data.

6. The image decoding unit as defined in claim 1, wherein the added data by said reconstruction unit is normalized to a positive value in 8 bits.

7. The image decoding unit as defined in claim 1, wherein said motion compensator performs sub-pel motion compensation, the sub-pel motion compensation including at least one of half-pel motion compensation and quarter-pel motion compensation.

8. An image decoding unit operable to decode an encoded image signal, the image decoding unit comprising:
    a decoding unit operable to decode the encoded image signal to generate at least two kinds of intermediate data;
    a memory group comprising plural data memories that are operable to store the at least two kinds of intermediate data;
    a first selector operable to select one of said plural data memories of said memory group, and operable to acquire first intermediate data of the at least two kinds of intermediate data;
    a second selector operable to select one of said plural data memories of said memory group, and operable to acquire second intermediate data of the at least two kinds of intermediate data;
    a reconstruction unit operable to generate reconstructed image data using the first intermediate data acquired by said first selector and the second intermediate data acquired by said second selector;
    a third selector operable to select and acquire data from one of said plural data memories of said memory group or an output of said reconstruction unit;
    a memory operable to store the data acquired by said third selector; and
    a data transfer controller operable to send data transfer command to said first selector, said second selector and said third selector, and operable to select a data transfer source for each of the selectors.

9. The image decoding unit as defined in claim 8, wherein the encoded image signal to be decoded is an image signal encoded by employing DCT and entropy encoding,
    wherein said decoding unit comprises an entropy decoder, an inverse quantizer, an inverse DCT unit, and a motion compensator, and
    wherein said decoding unit is operable to generate at least two kinds of intermediate data.

10. The image decoding unit as defined in claim 8, wherein the first intermediate data is local prediction image data and the second intermediate data is local prediction error data.

11. A data transfer method utilizing an image decoding unit, the image decoding unit including: a decoding unit operable to decode an encoded image signal to generate at least two kinds of intermediate data; a memory group including plural data memories that are operable to store the at least two kinds of intermediate data; a first selector operable to select one of the plural data memories of the memory group, and operable to acquire first intermediate data of the at least two kinds of intermediate data; a second selector operable to select one of the plural data memories of the memory group, and operable to acquire second intermediate data of the at least two kinds of intermediate data; a reconstruction unit operable to generate reconstructed image data using the first intermediate data acquired by the first selector and the second intermediate data acquired by the second selector; a third selector operable to select and acquire data from one of the plural data memories of the memory group or an output of the reconstruction unit; a memory operable to store the data acquired by the third selector; and a data transfer controller operable to send data transfer command to the first selector, the second selector and the third selector, and operable to select a data transfer source for each of the selectors, the data transfer method comprising:

issuing a data transfer command including a first operant that assigns the third selector, as a data transfer source, one of the plural data memories of the data group or an output of the reconstruction unit, a second operant that assigns the first selector, as a data transfer source, one of the plural data memories of the data group, and a third operant that assigns the second selector, as a data transfer source, one of the plural data memories of the data group; and acquiring data from a data transfer source selected by a selector that has received the data transfer command, wherein, when a data transfer command is issued assigning the third selector the output of the reconstruction unit as the data transfer source, the first selector acquires first intermediate data from an assigned data memory, the second selector acquires second intermediate data from an assigned data memory, the reconstruction unit generates reconstructed image data using the first intermediate data and the second intermediate data, and the reconstruction unit stores the generated reconstructed image data into the memory successively.

12. A data transfer method utilizing an image decoding unit, the image decoding unit including: a decoding unit operable to decode an encoded image signal to generate at least two kinds of intermediate data; a memory group comprising plural data memories that are operable to store the at least two kinds of intermediate data; a first selector operable to select one of the plural data memories of the memory group, and operable to acquire first intermediate data of the at least two kinds of intermediate data; a second selector operable to select one of the plural data memories of the memory group, and operable to acquire second intermediate data of the at least two kinds of intermediate data; a reconstruction unit operable to generate reconstructed image data using the first intermediate data acquired by the first selector and the second intermediate data acquired by the second selector; a third selector operable to select and acquire data from one of the plural data memories of the memory group or an output of the reconstruction unit; a memory operable to store the data acquired by the third selector; and a data transfer controller operable to send data transfer command to the first selector, the second selector and the third selector, and operable to select a data transfer source for each of the selectors, the data transfer method comprising:

issuing a data transfer command including an operant that assigns the third selector, as a data transfer source, one of the plural data memories of the data group or an output of the reconstruction unit;

acquiring data from an assigned data transfer source selected by the third selector, upon receipt of the data transfer command;

wherein, when a data transfer command is issued assigning the third selector the output of the reconstruction unit as the data transfer source, the first selector acquires first intermediate data from a pre-assigned data memory, the second selector acquires second intermediate data from a pre-assigned data memory, the reconstruction unit generates reconstructed image data using the first intermediate data and the second intermediate data, and the reconstruction unit stores the generated reconstructed image data into the memory successively.

13. An image encoding device comprising:

an image decoding unit; a motion detector; a prediction error process unit; a DCT unit; a quantizer; an entropy encoder; and a sending buffer, wherein said image decoding unit comprising;

a decoding unit comprising an inverse quantizer, an inverse DCT unit, and a motion compensator, and operable to decode an encoded image signal to generate at least two kinds of intermediate data;

a data memory unit comprising a first memory and a second memory, said first memory and said second memory being operable to store cooperatively the at least two kinds of intermediate data;

a reconstruction unit operable to generate reconstructed image data, by inputting the at least two kinds of intermediate data stored in said first memory and said second memory; and a third memory operable to store the reconstructed image data generated by said reconstruction unit, wherein said motion detector detects a motion vector for an input image, using the reconstructed image data generated by said image decoding unit as a reference image, wherein said prediction error process unit obtains a prediction error by calculating a difference between the input image and a prediction image fed by said image decoding unit after motion compensation based on the motion vector, wherein said DCT unit obtains DCT coefficients performing a DCT process for the prediction error, wherein said quantizer obtains quantized DCT coefficients quantizing the DCT coefficients, wherein said entropy encoder encodes the quantized DCT coefficients and the motion vector into variable-length codes to generate encoded image data, and wherein said sending buffer stores temporally the encoded image data and sends the encoded image data in a sending bit stream successively.

14. The image encoding device as defined in claim 13, wherein a generation process of the reconstructed image data by said reconstruction unit and a storing process of the reconstructed image data into said third memory are performed in parallel.

15. The image encoding device as defined in claim 13, wherein said reconstruction unit adds the local prediction error data acquired from said first memory and the local prediction image data acquired from said second memory to obtain added data, normalizes the added data to a predetermined bit number to obtain normalized data, and outputs the normalized data.

16. An image decoding device comprising:

an image decoding unit; and a receiving buffer operable to store temporally a received bit stream composing encoded image data, wherein said image decoding unit comprising;

a decoding unit comprising an entropy decoder, an inverse quantizer, an inverse DCT unit, and a motion compensator, and operable to decode an encoded image data to generate at least two kinds of intermediate data;

a data memory unit comprising a first memory and a second memory, said first memory and said second memory being operable to store cooperatively the at least two kinds of intermediate data;

a reconstruction unit operable to generate reconstructed image data, by inputting the at least two kinds of intermediate data stored in said first memory and said second memory; and a third memory operable to store the reconstructed image data generated by said reconstruction unit, wherein said receiving buffer feeds the encoded image data stored therein to said entropy decoder of said image decoding unit, and wherein said image decoding unit calculates DCT coefficients and a motion vector to generate local prediction error data and local prediction image data, both being the intermediate data, generates reconstructed image data using the intermediate data, stores the generated reconstructed image data into said third memory as pictorial image, and feeds the stored pictorial image to an externally connected image display unit.

17. The image decoding device as defined in claim 16, wherein a generation process of the reconstructed image data by said reconstruction unit and a storing process of the reconstructed image data into said third memory are performed in parallel.

18. The image decoding device as defined in claim 16, wherein said reconstruction unit adds the local prediction error data acquired from said first memory and the local prediction image data acquired from said second memory to obtain added data, normalizes the added data to a predetermined bit number to obtain normalized data, and outputs the normalized data.

19. An image decoding method to decode an encoded image signal, the image decoding method comprising:

decoding the encoded image data to generate at least two kinds of intermediate data;

storing the at least two kinds of intermediate data into a first memory and a second memory;

generating reconstructed image data using the intermediate data inputted from said first memory and said second memory; and storing the reconstructed image data generated in said generating into a third memory, wherein said generating the reconstructed image data and said storing the reconstructed image data are performed in parallel.

20. The image decoding method as defined in claim 19, wherein the encoded image signal to be decoded is an image signal encoded by employing DCT and entropy encoding, wherein said decoding comprises entropy decoding, inverse quantizing, inverse DCT processing, and motion compensation processing, wherein in the entropy decoding, an inputted encoded image signal is decoded to feed quantized DCT coefficients and a motion vector, wherein in the inverse quantizing and the inverse DCT processing, the quantized DCT coefficients fed in the entropy decoding are processed to feed DCT coefficients, and wherein in the motion compensation processing, motion compensation is performed using the motion vector fed in the entropy decoding.

21. The image decoding method as defined in claim 19, wherein the intermediate data to be stored in said first memory is local prediction error data fed in the inverse DCT processing, and the intermediate data to be stored in said second memory is local prediction image data fed in the motion compensation processing, and wherein said generating reconstructed image data comprises:

acquiring the local prediction error data stored in said first memory and the local prediction image data stored in said second memory;

generating reconstructed image data from the acquired local prediction error data and local prediction image data in synchronization with the acquisition of the local prediction error data and the local prediction image data; and storing successively the generated reconstructed image data into said third memory.

22. The image decoding method as defined in claim 19, wherein said generating reconstructed image data comprises adding the local prediction error data acquired from said first memory and the local prediction image data acquired from said second memory to obtain added data, normalizing the added data to a predetermined bit number to obtain normalized data, and outputting the normalized data.

23. The image decoding method as defined in claim 19, wherein the motion compensation processing comprises performing sub-pel motion compensation.

24. An image encoding method utilizing an image decoding unit, the image decoding unit including: a decoding unit comprising an inverse quantizer, an inverse DCT unit, and a motion compensator, and operable to decode an encoded image signal to generate at least two kinds of intermediate data; a data memory unit including a first memory and a second memory, the first memory and the second memory being operable to store cooperatively the at least two kinds of intermediate data; a reconstruction unit operable to generate reconstructed image data using the at least two kinds of intermediate data inputted from the first memory and the second memory; and a third memory operable to store the reconstructed image data generated by the reconstruction unit, wherein a generation process of the reconstructed image data by the reconstruction unit and a storing process of the reconstructed image data into the third memory are performed in parallel, the image encoding method comprising:

motion detection processing to detect a motion vector for an input image, using reconstructed image data fed by the image decoding unit as a reference image, prediction error processing to obtain a prediction error by calculating a difference between the input image and a prediction image fed by the image decoding unit after motion compensation based on the motion vector, DCT processing to obtain DCT coefficients from the prediction error, quantizing the DCT coefficients to obtains quantized DCT coefficients, entropy-encoding the quantized DCT coefficients and the motion vector into variable-length codes to generate encoded image data, storing temporally the encoded image data, and sending the encoded image data in a sending bit stream successively.

25. An image decoding method utilizing an image decoding device, the image decoding device including an image decoding unit and a receiving buffer, the image decoding unit including: a decoding unit including an entropy decoder, an inverse quantizer, an inverse DCT unit, and a motion compensator, and operable to decode an encoded image signal to generate at least two kinds of intermediate data; a data memory unit comprising a first memory and a second memory, the first memory and the second memory being operable to store the at least two kinds of intermediate data; a reconstruction unit operable to generate reconstructed image data, by inputting the at least two kinds of intermediate data stored in the first memory and the second memory; and a third memory operable to store the reconstructed image data generated by the reconstruction unit, wherein a generation process of the reconstructed image data by the reconstruction unit and a storing process of the reconstructed image data into the third memory are performed in parallel, the image decoding method comprising:

storing temporally into the receiving buffer a received bit stream composing image data, calculating, in the image decoding unit, DCT coefficients and a motion vector from the inputted encoded image data, generating, in the image decoding unit, the intermediate data composed of local prediction error data and local prediction image data, generating, in the image decoding unit, reconstructed image data using the intermediate data, storing the generated reconstructed image data into the third memory as pictorial image, and feeding the stored pictorial image to an externally connected image display unit.

* * * * *